(12) United States Patent
Jones et al.

(10) Patent No.: US 7,315,937 B2
(45) Date of Patent: Jan. 1, 2008

(54) MICROPROCESSOR INSTRUCTIONS FOR EFFICIENT BIT STREAM EXTRACTIONS

(75) Inventors: Darren M. Jones, Los Altos, CA (US);
Ryan C. Kinter, Los Altos, CA (US);
Rivka Shenhav, Saratoga, CA (US);
Radhika Thekkath, Palo Alto, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 452 days.

(21) Appl. No.: 10/956,490

(22) Filed: Oct. 1, 2004

(65) Prior Publication Data

US 2006/0101258 A1    May 11, 2006

(51) Int. Cl.
*G06F 7/76* (2006.01)
(52) U.S. Cl. ..................................... 712/300
(58) Field of Classification Search ............... 712/300
See application file for complete search history.

(56) References Cited

U.S. PATENT DOCUMENTS

| | | | |
|---|---|---|---|
| 5,357,620 A * | 10/1994 | Suzuki ..................... 711/220 |
| 5,535,412 A | 7/1996 | Nadehara | |
| 5,623,621 A | 4/1997 | Garde | |
| 6,760,837 B1 * | 7/2004 | Laurenti et al. ............ 712/300 |
| 6,782,447 B2 | 8/2004 | Ostler et al. | |
| 2002/0053015 A1 * | 5/2002 | Tan et al. ..................... 712/42 |
| 2002/0116602 A1 * | 8/2002 | Kissell et al. ............... 712/223 |
| 2003/0120904 A1 * | 6/2003 | Sudharsanan et al. ...... 712/223 |
| 2005/0108312 A1 | 5/2005 | Chen et al. | |
| 2005/0166036 A1 | 7/2005 | Catherwood et al. | |

FOREIGN PATENT DOCUMENTS

| | | |
|---|---|---|
| EP | 0992880 | 4/2000 |
| EP | 1039370 | 9/2000 |
| WO | WO 0144921 | 6/2001 |

OTHER PUBLICATIONS

James Ross Goodman: "Energy Scalable Reconfigurable Cryptographic Hardware for Portable Applications." pp. 141, 142 & 147. Aug. 2000.
LEXRA LX5280 Data Sheet; Lexra, Inc., Release 1.9; Apr. 30, 2001. Introduction, Chapters 2 and 5.
LEXTR LX5380 Delta Data Sheet; Lexra, Inc., Revision 1.1. (DRAFT), Nov. 16, 2001; Appendix A, p. A.1, A.2, and A.5.

* cited by examiner

*Primary Examiner*—William M. Treat
(74) *Attorney, Agent, or Firm*—Gary R. Stanford; James W. Huffman

(57) ABSTRACT

A method of extracting bits of a bit stream including retrieving bits from the bit stream into an accumulator, specifying a size value specifying a number of bits to extract, storing a position value into a control register, and executing a bit extraction instruction. The bit extraction instruction includes copying the size value number of bits from the accumulator beginning at the position value into a target register, setting any remaining bits of the target register to zero, and decrementing the position value by an amount based on the size value. The method may include loading bits from a bit stream into a register and moving the contents of the register into the accumulator to replenish the accumulator. The method may include determining, based on the position value, whether the accumulator needs to be replenished, and if not, branching to bypass replenishing functions.

39 Claims, 13 Drawing Sheets

| INSTRUCTION MNEMONIC AND FORMAT | FUNCTION |
|---|---|
| EXTP rt, ac, size | Extract size+1 bits from the combined HI-LO pair of the specified accumulator ac beginning at bit position pos and place extracted bits into the least signficant bits of the rt register. The extracted bits are right-justified in the rt register and the remaining upper bits of the rt register are zeroed. The value pos is defined in the DSPControl register and specifies the left-most bit position of the combined HI-LO pair. The value size is an immediate value specified in the instruction. |
| EXTPDP rt, ac, size | Extract size+1 bits from the combined HI-LO pair of the specified accumulator ac beginning at bit position pos and place extracted bits into the least signficant bits of the rt register, and decrement pos by size+1, or pos = pos - (size+1). The extracted bits are right-justified in the rt register and the remaining upper bits of the rt register are zeroed. The value pos is defined in the DSPControl register and specifies the left-most bit position of the combined HI-LO pair. The value size is an immediate value specified in the instruction. |
| EXTPV rt, ac, rs | Extract size+1 bits from the combined HI-LO pair of the specified accumulator ac beginning at bit position pos and place extracted bits into the least significant bits of the rt register. The extracted bits are right-justified in the rt register and the remaining upper bits of the rt register are zeroed. The value pos is defined in the DSPControl register and specifies the left-most bit position of the combined HI-LO pair. The value size is a variable specified in the 5 least significant bits of the rs register. |
| EXTPDPV rt, ac, rs | Extract size+1 bits from the combined HI-LO pair of the specified accumulator ac beginning at bit position pos and place extracted bits into the least significant bits of the rt register, and decrement pos by size+1, or pos = pos - (size+1). The extracted bits are right-justified in the rt register and the remaining upper bits of the rt register are zeroed. The value pos is defined in the DSPControl register and specifies the left-most bit position of the combined HI-LO pair. The value size is a variable specified in the 5 least significant bits of the rs register. |
| CLTHIP ac | Copy LO to HI for the specified accumulator ac and increment the pos field in the DSPControl register by 32. |
| MTHI rt, ac | Move contents of rt register to the HI register of the selected accumulator ac. |
| MTLO rt, ac | Move contents of rt register to the LO register of the selected accumulator ac. |
| MTHLIP rt, ac | Combined function of CLTHIP and MTLO: copy LO to HI for the specified accumulator ac, copy contents of rt register to LO, and increment the pos field in the DSPControl register by 32. |
| WRDSP rt, ptn, num | Write num bits from right-most location of the rt register into DSPControl register right justified starting at bit position ptn of DSPControl register. |
| BPOSGE32 offset | Branch to offset if the pos value of the DSPControl register is greater than or equal to 32. |

*FIG. 5*

```
/* Initialization step before starting to use the bit extraction process */
/* The pseudo code shows the first two words of the bit stream loaded
   into ac3*/
    LW $r2,0($r7)
    LW $r3,4($r7)
    MTLO $ac3,$r2
    MTHI $ac3,$r3
    ADDI $r7, $r7, 8 ; update pointer to ready for the next load
/* The pos field in DSPcontrol is initialized to 63 (for the MIPS32 arch) */
    ADDI $r4, $0, 63
    WRDSP $r4,0,6

/* Now that the state is all initialized, the main part, i.e, the bit extraction*/
/* is the following sequence of instructions. This would probably be implemented */
/* as an inline function, where the number of bits to be extracted is available */
/* in some register, say $r5 */ bit_extract:
/* extract size bits in r5 from ac3 at left-most position pos into r6 */
    EXTPDPV $r6,$ac3,$r5
/* check to ensure that there are sufficient bits left for next time */
    BPOSGE32 done
    LW $r2, 0($r7) ; branch delay, load ahead of time, no harm in doing so
/* refill bits from the stream */
    ADDI $r7, $r7, 4
    CLTHIP $ac3
    MTLO $ac3,$r2
done:
```

Copyright © 2004. MIPS Technologies, Inc. All rights reserved.

FIG. 9

```
Loop:
    LW $r1, 0($r7) ; load the number of bits in the Huffman Table
    LW $r2, 4($r7) ; load the codeword from the table
    EXTPV $r3,$ac2,$r1 ; extract $r1 bits from the bit stream for comparing
    BNEQ $r3, $r2, loop ; compare code words
    ADDI $r7, $r7, 8 ;prepare for the next code word
match: /* the previous index matched, we added in the branch delay slot */
/* undo the previous ADDI to get the matched codeword table index */

Copyright © 2004. MIPS Technologies, Inc. All rights reserved.
```

FIG. 10

MICROPROCESSOR INSTRUCTIONS FOR EFFICIENT BIT STREAM EXTRACTIONS

FIELD OF THE INVENTION

The present invention relates in general to microprocessor architecture, and more particularly to a set of microprocessor instructions that enable efficient extraction of bits from a bit stream.

BACKGROUND OF THE INVENTION

The bit extraction process is an important part of algorithms employed by many streaming data applications, including audio, video and communications applications. In order to extract data from a formatted bit stream, the extraction process first has to parse frame headers and sub-headers of the bit stream to determine the size and type of the encoded data. The width of the fields in the header can vary based on previously parsed fields. This makes the bit extraction process time consuming, so that the process typically uses a large percentage of algorithm cycles of a microprocessor, including those based on a RISC (Reduced Instruction Set Computer) with a load/store architecture. The load/store architecture requires that portions of the bit stream are first read from microprocessor memory into one or more registers, which are then used to extract the appropriate bits.

The bit extraction process performed by most conventional microprocessors on formatted streaming data is inherently inefficient given the variability in the field widths within the header of each packet including optional variable-sized packet sub-headers. In particular, in order to extract a variable number of bits from the top of a register, the bit extraction process of conventional configurations required several instructions to shift, generate the mask, keep track of how many bits have been extracted, re-shift and so on. For example, in the digital audio compression standard AC-3, after the computation (mainly FFT, or Fast Fourier Transform) is fully optimized, the bit extraction procedures typically consumed as much as 30-40% of the remaining time. Similarly, when performing Huffman decoding, such as during JPEG (compression standard by the Joint Photographic Experts Group) processing, the bit extraction process typically consumed as much as 40-50% of the total time. Some microprocessors employing a two-instruction method require that interrupts be disabled between the two instructions. Such method inherently decreases efficiency by requiring disablement and re-enablement of interrupts and potentially compromises interrupt-driven processes.

It is desired to provide a microprocessor which extract bits from a bit stream more efficiently to improve performance, including improving performance of applications employing formatted streaming data with variable field widths.

SUMMARY

A processor configured to perform efficient bit stream extraction according to an embodiment of the present invention includes multiple registers and logic. The registers include a first register that stores bits copied from a bit stream, a second register that stores a position value, and a third register. The logic executes an extraction instruction that causes the logic to extract a specified number of bits beginning at the position value from the first register into the third register and to decrement the position value in the second register by an amount based on the specified number of bits.

In one embodiment, the first register is an accumulator, the second register is a control register, and the third register is a general purpose register. The accumulator may be configured as a HI-LO pair of registers in which the accumulator is periodically replenished with additional bits from the bit stream during processing. For example, the logic may further execute a copy instruction that causes the logic to copy the LO register to the HI register and to increase the position value by the size of the LO register. In this case, a move instruction may be used to copy the contents of a fourth register, which was previously loaded with bits from the bit stream, into the LO register. Alternatively, the logic may execute a combination move instruction that causes the logic to copy the LO register to the HI register, to increase the position value by the size of the LO register, and to move contents of a fourth register into the LO register. The extraction process may be implemented using a loop in which a branch instruction or the like is used to bypass the replenishing instructions until needed. The branch instruction may cause the logic to branch based on the position value, which indicates the number of bits remaining the accumulator yet to be extracted. In one embodiment, the branch instruction determines whether the position value indicates a bit of the LO register of the accumulator.

The extraction instruction may include a field for storing an immediate size value providing the specified number of bits to extract. Alternatively, the registers may include a fourth register which stores a size value providing the specified number of bits to extract. In this alternative variable case, the extraction instruction includes a source field which specifies the fourth register and the logic retrieves the size value from the fourth register to determine the specified number of bits to extract. In either case, the extraction instruction causes the logic to decrement the position value based on the size value, whether provided as an immediate value in the instruction or as a variable value stored in the source register.

A microprocessor system according to an embodiment of the present invention includes a microprocessor and a memory. The microprocessor includes a first register that stores bits copied from a bit stream, a second register that stores a position value, a third register, and an execution unit that executes program instructions. The memory stores the instructions, which include a bit extraction instruction that causes the execution unit to extract a specified number of bits beginning at the position value from the first register into the third register and to decrement the position value based on the specified number of bits.

The first register may be an accumulator, the second register may be a control register and the third register may be a general purpose register. The accumulator may further include a HI-LO pair of registers, where the instructions may further include a move instruction which causes the execution unit to copy the LO register to the HI register and to increase the position value by the size of the LO register. The move instruction may further cause the execution unit to copy the contents of a fourth register into the LO register. The instructions may further include a branch instruction that causes the execution unit to branch to a specified offset based on the position value. In one aspect, the branch instruction causes the execution unit to determine whether the position value indicates a bit position of the LO register.

In one embodiment, the bit extraction instruction includes a field storing an immediate size value which provides the specified number of bits to extract. In an alternative embodiment, a fourth register stores a size value which provides the specified number of bits to extract. In this case, the bit extraction instruction includes a field specifying the fourth register as including the size value, and the bit extraction instruction causes the execution unit to retrieve the size value from the fourth register to determine the specified number of bits to extract. In either of these embodiments, the bit extraction instruction may leave the position value unmodified or may further cause the execution unit to decrement the position value based on the size value.

The microprocessor system may further include a bit stream file stored in the memory. In this case, the instructions may further include a load instruction that causes the execution unit to load portions of the bit stream file into a fourth register and a move instruction that causes the execution unit to move the contents of the fourth register into the first register. The microprocessor system may further include at least one input/output device which includes a buffer that stores data from a bit stream. The instructions may include a load instruction that causes the execution unit to load data from the buffer into a fourth register and a move instruction that causes the execution unit to move the contents of the fourth register into the first register.

A bit extraction instruction according to an embodiment of the present invention is executed on a microprocessor having multiple registers including a control register storing a position value. The bit extraction instruction includes opcode bits for designating the bit extraction instruction and operand bits that designate an accumulator storing bits from a bit stream, a target register, and a size parameter that determines a size number of bits to extract. When the bit extraction instruction is executed on the microprocessor, the size number of bits from the bit steam beginning at a bit location of the accumulator indicated by the position value are retrieved from the accumulator and copied into the target register, and the position value is decremented by an amount based on the number of bits.

In one embodiment, the opcode bits include a first opcode field denoting an extended instruction set, a function field specifying a subclass of instructions, and a second opcode field specifying the bit extraction instruction. The size parameter may be a size field of the instruction which stores an immediate size value which determines the number of bits to extract. In an alternative embodiment, the size parameter is a field designating a source register that stores the size value. In either case, when the bit extraction instruction is executed on the microprocessor, the position value stored in the control register is either left unmodified or is decremented based on the size value depending upon the variation of the instruction being executed.

A method of extracting bits of a bit stream by a processing system according to an embodiment of the present invention includes retrieving bits from the bit stream into an accumulator, specifying a size value that determines a number of bits to extract, storing a position value into a control register, and executing a bit extraction instruction. Executing the instruction includes retrieving the position value from the control register, copying the size value number of bits from the accumulator into a target register beginning at a bit position of the accumulator determined by the position value, setting the remaining bits of the target register to zero, and decrementing the position value by an amount based on the size value.

The method may include specifying an immediate size value in the bit extraction instruction. Alternatively, the method may include storing the size value into a source register prior to executing the instruction, and, while executing the instruction, retrieving the size value from the source register prior to copying. In either case, the method may include decrementing the position value based on the specified size value after copying the bits.

The method may include loading bits from a bit stream into a general purpose register and moving the contents of the general purpose register into the accumulator. After decrementing the position value, the method may further include determining whether the position value indicates a sufficient number of bits in the accumulator for another bit extraction, and if the position value indicates an insufficient number of bits, retrieving additional bits from the bit stream into the accumulator. The method may include comparing the position value with a predetermined register size, and branching to a specified offset address if the position value indicates a sufficient number of bits.

If the accumulator includes a HI-LO pair of registers, the method may include determining whether the position value points to a bit location in the LO register, and, if so, copying the contents of the LO register to the HI register and incrementing the position value by the size of the LO register. If the position value points to a bit location of the LO register, the method may further include loading bits from a bit stream into a general purpose register and moving the contents of the general purpose register into the LO register. If the position value points to a bit location in the HI register, the method may include branching to a specified offset address. This procedure may be repeated as often as desired to extract desired fields from the bit stream. Furthermore, the size value may be modified to handle variable fields in the bit stream, providing significantly improved flexibility and efficiency in bit stream extraction processing.

A computer program product for use with a computing device according to an embodiment of the present invention includes a computer usable medium having computer readable program code embodied in the medium, for causing a processing element configured to execute a bit extract instruction to extract bits from a bit stream. The computer readable program code includes first program code for providing registers which include a control register for storing a position value, an accumulator for storing bits from a bit stream, and a target register for storing bits extracted from the accumulator, and second program code for providing logic for executing the bit extract instruction in which the logic retrieves the position value, extracts a specified number of bits from the accumulator beginning at the position value into the target register, and decrements the position value by an amount based on the specified number of bits.

A computer data signal embodied in a transmission medium according to an embodiment of the present invention includes computer-readable program code for providing a microprocessor core that extracts bits from a bit stream when executing a bit extraction instruction. The program code includes first program code for providing registers including a control register for storing a position value, an accumulator for storing bits from a bit stream, and a target register for storing bits extracted from the accumulator, and second program code for providing logic for executing the bit extract instruction in which the logic retrieves the position value, extracts a specified number of bits from the accumulator beginning at the position value into the target register, decrements the position value by an amount based on the specified number of bits.

Other features and advantages of the present invention will become apparent upon study of the remaining portions of the specification and drawings.

BRIEF DESCRIPTION OF THE DRAWINGS

FIG. 5 is a table showing the instruction mnemonic, format and function description for each of the extraction instruction variants along with the instruction mnemonic, format and function description of several other instructions that facilitate efficient bit extraction processing;

FIG. 8A illustrates an initialization process to load a portion of the bit stream into a selected accumulator to enable the bit stream process;

FIG. 8B is a block diagram illustrating the result of execution of the variable and decrement instruction variant after the initialization process of FIG. 8A;

FIG. 8C is a block diagram showing the result of modifying the size value for the next bit extraction operation to illustrate variable bit extraction;

FIG. 8D is a block diagram illustrating the result of executing the variable and decrement instruction variant again using the new size value of FIG. 8C;

FIG. 8E is a block diagram illustrating the result of executing the CLTHIP instruction used to copy the contents of the LO register to the HI register of the selected accumulator;

FIG. 8F is a block diagram illustrating the result of updating the contents of the LO register of the selected accumulator with the next word from the bit stream using load and move instructions;

FIG. 9 shows pseudo code of an exemplary bit extraction process for a common case employing the variable and decrement extraction instruction variant shown and described in FIGS. 8A-8F; and FIG. 10 shows pseudo code for a Huffman decode compare loop employing the variable extraction instruction variant.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventors of the present application have recognized the need to efficiently extract bits from a bit stream to improve performance of a microprocessor core executing digital signal processing (DSP) applications, including microprocessor cores used in many consumer products such as set-top boxes, DVD players, DVD recorders, digital cameras, VoIP phones, residential gateways, DSL and VDSL modems, etc., whether implemented separately or as an embedded system and/or a System on Chip (SOC) or the like. They have therefore developed a sub-set of microprocessor bit extraction instructions that efficiently extract bits from a bit stream including variable-length decoding of the bit stream, such as Huffman decoding and the like, as will be further described below with respect to FIGS. 1-10.

Figure 1:
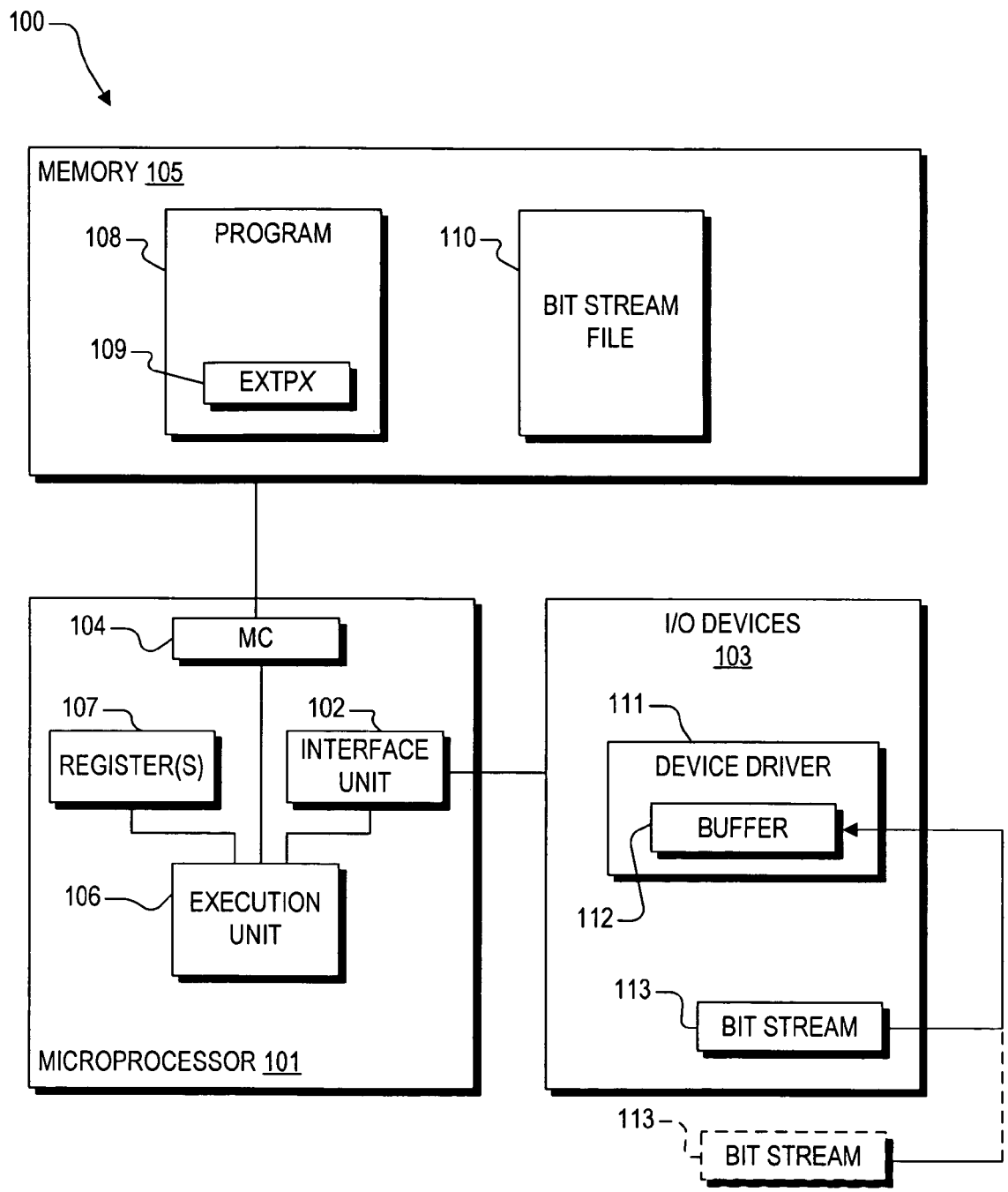
FIG. 1 is a simplified block diagram of a microprocessor system including a microprocessor implemented according to an exemplary embodiment of the present invention configured to extract bits from a bit stream when executing an extraction instruction representing a sub-set of extraction instruction variants.

FIG. 1 is a simplified-block diagram of a microprocessor system 100 including a microprocessor 101 implemented according to an exemplary embodiment of the present invention. The microprocessor 101 is configured to extract bits of a bit stream when executing an extraction (EXTPX) instruction 109 of a program 108 stored in a memory 105. The EXTPX instruction 109 illustrated in FIG. 1 represents any one of several extraction instruction variants, which include a basic form of the instruction EXTP, a decrement variant EXTPDP, a variable variant EXTPV, and a combination variable and decrement variant EXTPDPV.

The microprocessor 101 is coupled to one or more input/output (I/O) devices 103 and to the memory 105, which stores the program 108 containing one or more instructions including the EXTPX instruction 109. The microprocessor 101 includes a memory controller (MC) 104 for interfacing the memory 105 and at least one execution unit 106 for performing functions and computations indicated by the program instructions. The microprocessor 101 includes one or more registers 107 for storing and manipulating data values and variables as controlled by program instructions, where at least one of the registers 107 may be incorporated within the execution unit 106. Any type of register is contemplated, such as including one or more general purpose registers (GPRs) and the like, and one or more special purpose registers (SPRs) and the like.

In one embodiment, the microprocessor 101 conforms substantially to a microprocessor architecture from MIPS Technologies, Inc., such as according to either of the MIPS32™ or MIPS64™ architectures, in which the selected architecture may further be extended by a Digital Signal Processor (DSP) Application-Specific Extension (ASE). In one embodiment, the DSP ASE is an extension of the basic MIPS™ microprocessor core and is integrated therewith and thus incorporated on the same core integrated circuit (IC) or chip at core synthesis. The DSP ASE extension to the core enables the same core to perform extended DSP functions rather than requiring a separate coprocessor. In the illustrated embodiment, the extraction instruction and its variants are DSP ASE instructions synthesized into the same core of the microprocessor 101 and included within the core instruction set. It is appreciated, however, that the present invention is not limited to MIPS microprocessor architectures or extensions, and may be used by other processors or processing logic and the like in which it is desired to implement efficient bit extraction. The extraction instructions may be implemented as part of the core instruction set, or may be implemented separately as part of a coprocessor. All such configurations are possible and contemplated as falling within the scope of the present invention.

The microprocessor system 100 may be implemented as a computer system, including but not limited to a personal computer, workstation computer, server computer, notebook computer, personal digital assistant, file server, print server, enterprise server, and the like. The microprocessor system 100 may also include or comprise an embedded system, including but not limited to a set-top box, an intelligent peripheral device, an automobile embedded system, an embedded system in an appliance, a mass storage controller, etc. The microprocessor system 100 may be configured to perform any one or more of various signal processing applications, including applications employing audio functions (e.g., AC-3, Pro Logic, etc.), still image functions (e.g., JPEG), video functions (e.g., MPEG), communications functions including wired and wireless communication functions, etc. The microprocessor system 100 is configured to be used for many different applications and products, including consumer products such as set-top boxes, DVD players, DVD recorders, digital cameras, VoIP phones, residential gateways, DSL and VDSL modems, etc.

The memory 105 includes any suitable storage medium memory for storing program instructions and data to be processed by the microprocessor 101, including but not limited to, dynamic random access memory (DRAM), static random access memory (SRAM), synchronous DRAM (SDRAM), double-data rate SDRAM (DDR-SDRAM), Rambus DRAM (RDRAM), read-only memory (ROM), programmable read only memory (PROM), erasable PROM (EPROM), electrically erasable PROM (EEPROM), FLASH memory, and the like, or any combination thereof.

In the illustrated embodiment, the memory 105 stores the program 108 including the EXTPX instruction 109 and further optionally stores a bit stream file 110. As described further below, a bit stream is read using a load word (LW) or a load double-word (LD) instruction from either a file (e.g., the bit stream file 110 or any other bit stream file stored in the memory 105) or from an input device driver buffer 112.

The I/O devices 103 include devices and components for receiving data as input for provision to the microprocessor 101 for processing, including but not limited to user input. The I/O devices 103 also comprise devices for receiving from the microprocessor 101 results of the processing and for outputting the results, including but not limited to user output. The I/O devices 103 may include, but are not limited to direct memory access controllers, timers, clocks, interrupt controllers, serial port controllers, parallel port controllers, USB port controllers, IEEE 1394 controllers, SCSI controllers, Fibre Channel controllers, floppy disk controllers, hard disk controllers, graphics controllers, display devices, keyboards, mice, scanners, plotters, printers, floppy disk drives, hard disk drives, optical storage devices, tape drives, digital cameras, and the like, or any combination thereof.

In the embodiment illustrated, the I/O devices 103 include a device driver 111, which further includes the device driver buffer 112 for temporary storage of data. The buffer 112 comprises any suitable storage medium memory for temporarily storing input data to be processed by the microprocessor 101 or output data from the microprocessor 101, including but not limited to the types of memory devices described above for the memory 105. In the illustrated embodiment, the buffer 112 is configured to receive and temporarily store data from a bit stream 113, which may be provided from another one of the I/O devices 103 or from any other source external to the microprocessor system 100 (shown in dashed lines). It is appreciated that bit stream data is sourced from the bit stream 113 or the bit stream file 110 or any other possible streaming data source, and provided to the microprocessor 101 for processing.

The MC 104 may include any combination of a memory-management unit (MMU) (not shown), a translation lookaside buffer (TLB) (not shown), a fixed mapping translation (FMT) (not shown), etc., or any other configuration as known to those skilled in the art. The particular variant of the EXTPX instruction 109 is fetched by the MC 104 of the microprocessor 101 and forwarded for execution by the execution unit 106 to extract bits from a selected bit stream source as further described below.

The execution unit 106 may include any combination of an arithmetic/logic unit (ALU) (not shown), a multiply/divide unit (MDU) (not shown) and similar type functional units as known to those skilled in the art. In one embodiment, the EXTPX instruction 109 is forwarded to and executed by an ALU within the execution unit 106.

Figure 2:
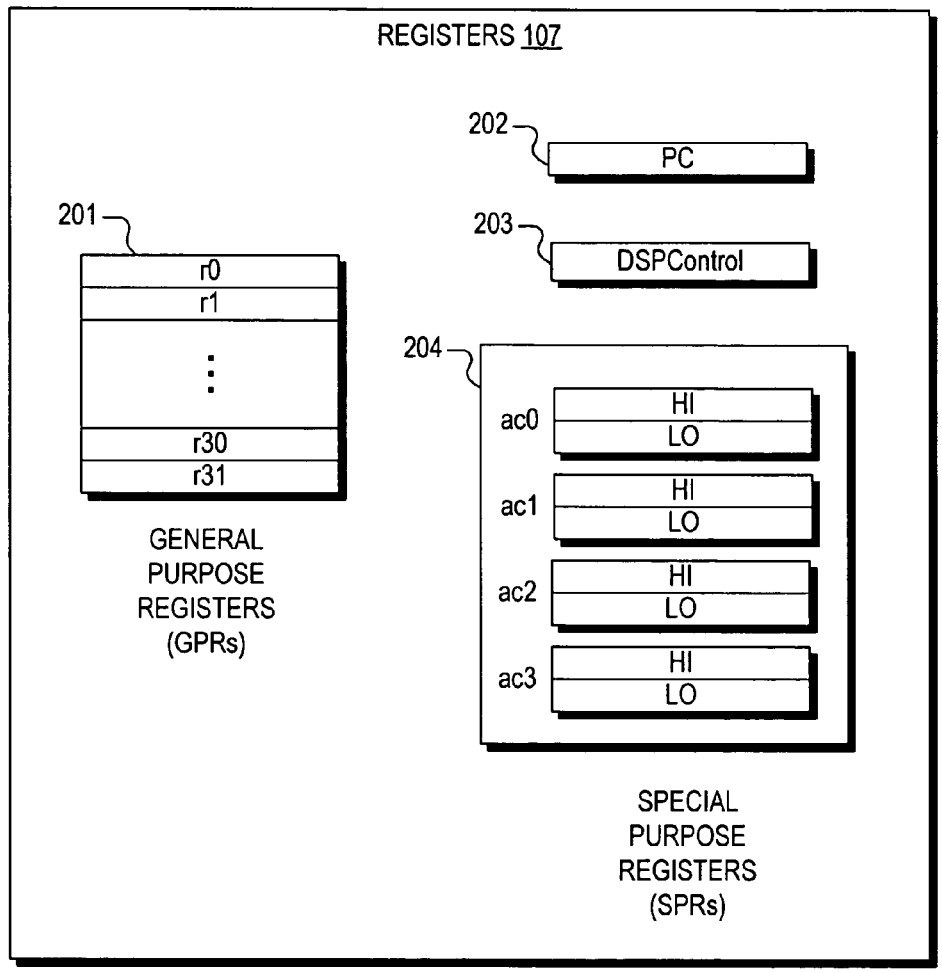
FIG. 2 is a more detailed block diagram of the registers of FIG. 1 including a set of general purpose registers (GPRs) and several types of special purpose registers (SPRs)

FIG. 2 is a more detailed block diagram of the registers 107, which include a set of GPRs 201 and several types of SPRs. For the MIPS™ configurations, there are relatively few hardware rules about the use of the GPRs 201 although their practical use may be governed by various conventions. Such restrictions and conventions are not further discussed herein except for the first register r0, which is conveniently hardwired to all zeroes in the illustrated embodiment. The SPRs include a program counter (PC) 202, a DSP control (DSPControl) register 203, and several accumulators 204. The program counter 202 stores the address of the instruction currently being executed by the microprocessor 101. The DSPControl register 203 holds certain state bits used for efficiently coding certain signal processing applications, including at least one field used by the EXTPX instruction 109 as further described below.

There are four defined HI-LO accumulator type registers 204, individually named ac0, ac1, ac2, and ac3. Each accumulator acx (where "x" is an integer ranging from 0 to 3) includes a pair of registers "HI" and "LO" typically used to hold the results of integer multiply, divide, and multiply-accumulate operations. As understood by those skilled in the art, many common DSP computations are accumulate-type functions in which a HI-LO accumulator is selected for use as the destination for such instructions. The instructions that target the accumulators 204, including the EXTPX instruction 109, use 2 bits to specify the target accumulator (e.g., 00b for ac0, 01b for ac1, 10b for ac2 and 11b for ac3, where "b" denotes a binary number). In the illustrated embodiment, the registers 107 are each 32-bit registers, where the HI and LO registers are 32 bits each for a total of 64 bits for each of the accumulators 204.

Figure 3:
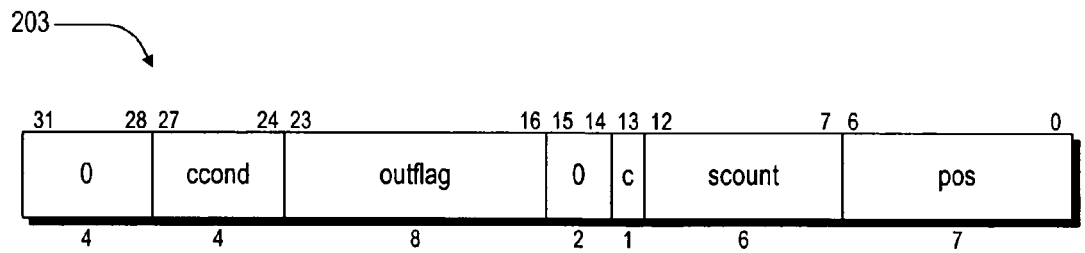
FIG. 3 is a more detailed block diagram of the fields of the DSPControl register of FIG. 2 including a position field used by the extraction instruction to indicate the initial bit location or position within a selected accumulator at which the extraction commences.

FIG. 3 is a more detailed block diagram of the fields of the DSPControl register 203, which includes a position field used by the extraction instruction to indicate an initial bit location or position within a selected accumulator at which the extraction commences. The first zero (or "0") field at bit location 31:28 is not used or reserved in the 32-bit version or is combined with the next condition code (ccode) field at DSPControl[27:24] in the 64-bit version. The ccode field, which stores condition code bits that are set after a compare instruction, is not used for the extraction instructions and is not further described. The next field at DSPControl[23:16] defines an outflag field which is written by hardware when certain instructions overflow or underflow or that may have saturated. The outflag is not used for the extraction instructions and is not further described. The next zero field at DSPControl [15:14] is written as zero and returns zero on read. The next field at DSPControl[13] defines an carry bit which is set and used by a special add instruction used to implement a 64-bit add across two GPRs 201 in the 32-bit configuration. The c field is not used for the extraction instructions and is not further described. The next field at DSPControl[12:7] defines an scount field which is used by an insertion instruction, but is not used for the extraction instructions and is not further described. The last field at DSPControl[6:0] defines a position or "pos" field which is used by the extraction instructions to indicate the extract position in a selected one of the accumulators 204. The EXTPDP and EXTPDPV instructions are decrement variants that decrement the pos field based on a specified "size" value during execution, as further described below. The EXTP and EXTPV instructions are non-decrement variants that leave the pos field unmodified.

Figure 4:
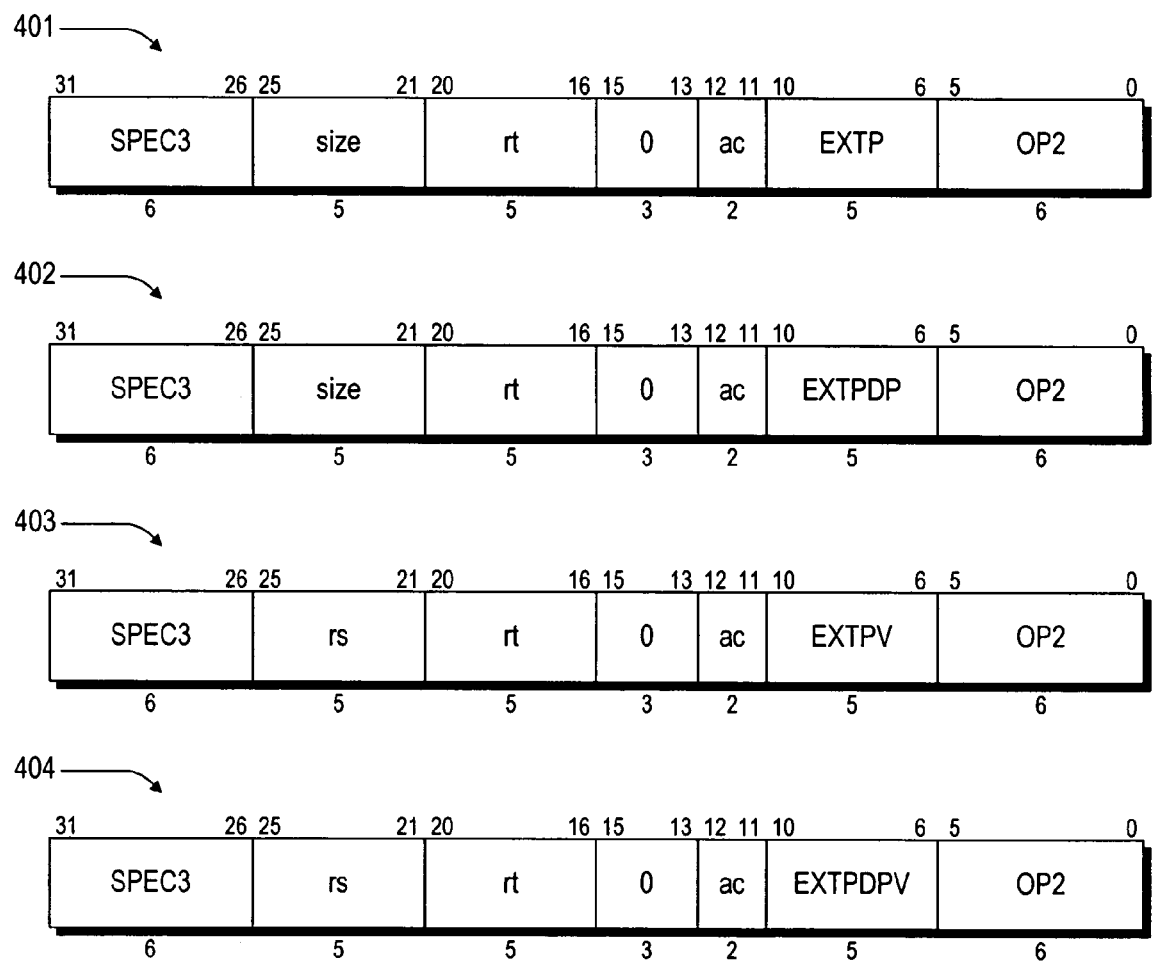
FIG. 4 is a block diagram illustrating an exemplary instruction encodings for particular extraction instruction variants for the MIPS32™ or MIPS64™ architectures including the MIPS™ DSP ASE.

FIG. 4 is a block diagram illustrating an exemplary instruction encodings 401, 402, 403 and 404 for the EXTP, EXTPDP, EXTPV and EXTPDPV instruction variants, respectively, for the MIPS32™ or MIPS64™ architectures including the MIPS™ DSP ASE. The present invention is not limited to the particular architecture illustrated or its instruction encoding, format or specific operation; similar or comparable instruction encoding, formats and operations are envisioned for different microprocessor architectures. In each of the illustrated instruction encodings 401-404, the left-most 6 bits 31:26 define an opcode field containing a special SPEC3 opcode denoting a sub-decode table for opcodes such as those instructions in the DSP ASE set. The extended instruction set for the DSP ASE are decoded according to predetermined opcode mapping. When the SPEC3 opcode is specified, the execution unit 106 decodes the last 6 bits 5:0 defining a function field specifying a subclass of instructions denoted herein as OP2. Although the function field may specify a DSP ASE instruction, the OP2 opcode specifies another subset of instructions defined in an operation (op) field located at bit locations 10:6, specifying any one of the extraction instruction variants, which completes the opcode encoding.

For the EXTP and EXTPDP instruction variants 401 and 402, the 5 bits 25:21 define a size field holding a size value specifying a number of bits to be extracted from a specified one of the accumulators 204 into a specified target register. Since specified directly in the instruction, the size value is an immediate value. For all of the extraction instruction variants, the actual number of extracted bits is size+1. For the EXTPV and EXTPDP instruction variants 403 and 404 having a "V" specified in the instruction mnemonic, the 5 bits 25:21 define a source register field identifying one of the GPRs 201 as a source register rs storing a variable size value. In the variable size variants, the size value is specified in the 5 least significant bits of the identified rs register. In this manner, rather than specifying an immediate 5-bit size value in the instruction as with the EXTP and EXTPDP instruction variants 401 and 402, the EXTPV and EXTPDP instruction variants 403 and 404 enable a user to compute a size value at execution time and to specify this variable 5-bit size value in a GPR 201 which is particularly advantageous for processing field widths in the bit stream which are unknown apriori and hence termed "variable". The next 5 bits 20:16 define a target register field identifying one of the GPRs 201 as the target register rt for storing the extracted bits. The next 5 bits 15:13 are zeroes and not used. The next two bits 12:11 specify one of the accumulators 204 from which the bits are to be extracted. For the EXTPDP and EXTPDPV instruction variants 402 and 404 having a "DP" specified in the instruction mnemonic, the microprocessor 101 decrements the pos field in the DSPControl register 203 by size+1, or pos is updated pos−(size+1). This decrementing the pos value automatically repositions the position pointer of the specified accumulator for the next bit extraction operation, without the need for explicit decrementing by the user.

FIG. 5 is a table showing the instruction mnemonic and format for each of the variants of the EXPT instruction and its corresponding function description, along with the instruction mnemonic, format and function description for several other instructions that facilitate efficient bit extraction processing. The instruction mnemonic and format for the first basic variant, or the EXTP instruction, is as follows:

EXTP rt, ac, size where rt specifies the target register, ac specifies one of the accumulators 204 as containing a portion of the bit stream, and where size indicates the number of bits to extract from the accumulator to the target register. As previously described, size is an immediate value specified in the EXTP instruction. As detailed in the function description, size+1 bits are extracted from the combined HI-LO pair of the specified accumulator ac beginning at bit position pointer pos specified in the DSPControl register 203. Position pos specifies the left-most bit position of the accumulator ac from which bits are to be extracted. In other words, the bit at position pos is extracted together with the next size bits to the right in the accumulator ac. The extracted bits are placed into the least-significant bits of the specified rt register of the GPRs 201 and right-justified, and the remaining upper bits are zeroed. The corresponding operation description by the microprocessor 101 using the above EXTP instruction format is as follows:

pos=DSPControl[5:0];
rt[31:0]=$0^{31 \cdots size+1}$||ac[pos:pos-size];

where the microprocessor 101 retrieves the pos value from the DSPControl register 203, zeroes the upper bits 31:(size+1) of the rt register, and copies the size+1 bits at locations pos:pos-size in the accumulator ac into the least significant bits size:0 of the rt register.

The instruction mnemonic and format for the decrement variant, or the EXTPDP instruction, is as follows:

EXTPDP rt, ac, size where, again, rt specifies the target register, ac specifies one of the accumulators 204 as containing a portion of the bit stream, and where size indicates the number of bits to extract from the accumulator to the target register. As previously described, size is an immediate value specified in the EXTPDP instruction variant. The function description of the EXTPDP instruction is similar to the EXTP instruction, except that the EXTPDP instruction additionally decrements pos in the DSPControl register 203 by the amount size+1 to prepare for the next bit extraction process from the same accumulator. The corresponding operation description by the microprocessor 101 using the above EXTPDP instruction format is as follows:

pos=DSPControl[5:0];
rt[3 1:0]=$0^{31 \cdots size+1}$||ac[pos:pos-size];
DSPControl[5:0]=pos−(size+1);

where the microprocessor 101 retrieves the pos value from the DSPControl register 203, zeroes the upper bits 31:(size+1) of the rt register, copies the size+1 bits at locations pos:pos-size in the accumulator ac into the least significant bits size:0 of the rt register, and also decrements the pos value in the DSPControl register 203.

The instruction mnemonic and format for the variable variant, or the EXTPV instruction, is as follows:

EXTPV rt, ac, rs here, again, rt specifies the target register, and ac specifies one of the accumulators 204 as containing a portion of the bit stream. In this case, the size value, which indicates the number of bits to extract from the accumulator to the target register, is a variable value specified in the source register rs. The function description of the EXTPV instruction is similar to the EXTP instruction, except that the EXTPV instruction first retrieves the size variable from the rs register. In the particular embodiments described herein, size is a 5-bit bit value retrieved from the 5 least-significant bits of the rs register. The corresponding operation description by the microprocessor 101 using the above EXTPV instruction format is as follows:

pos=DSPControl[5:0];
size rs[4:0];
rt[31:0]=$0^{31 \cdots size+1}$||ac[pos:pos-size];

where the microprocessor 101 retrieves the pos value from the DSPControl register 203, retrieves the size value from the rs register, zeroes the upper bits 31:(size+1) of the rt register, and copies the size+1 bits at locations pos:pos-size in the accumulator ac into the least significant bits size:0 of the rt register.

The instruction mnemonic and format for the combined decrement and variable variant, or the EXTPDPV instruction, is as follows:

EXTPDPV rt, ac, rs where, again, rt specifies the target register, ac specifies one of the accumulators 204 as containing a portion of the bit stream, and rs specifies one of the GPRs 201 as the source register containing the size variable. The function description of the EXTPDPV instruction is effectively a combination of the EXTPDP and EXTPV instructions. Thus, the EXTPDPV is similar in function to the EXTP instruction, except that the EXTPDPV instruction retrieves the size variable from the rs register and also decrements the pos value in the DSPControl register 203. The corresponding operation description by the microprocessor 101 using the above EXTPDPV instruction format is as follows:

pos=DSPControl[5:0];
size=rs[4:0];
rt[31:0]=$0^{31 \cdots size+1}$||ac[pos:pos-size];
DSPControl[5:0]=pos−(size+1);

where the microprocessor 101 retrieves the pos value from the DSPControl register 203, retrieves the size value from the rs register, zeroes the upper bits 31:(size+1) of the rt register, copies the size+1 bits at locations pos:pos-size in the accumulator ac into the least significant bits size:0 of the rt register, and also decrements the pos value in the DSPControl register 203 by the amount size+1.

Several additional instructions are shown which facilitate the initialization and processing of bit extraction. The "copy LO to HI and increment pos" or CLTHIP instruction has the following instruction format:

CLTHIP ac;

where ac is one of the accumulators 204. The CLTHIP instruction causes the microprocessor 101 to copy the contents of the LO register into the HI register of the accumulator ac and to increment pos in the DSPControl register 203 by 32. During successive bit extraction iterations using a given 64-bit accumulator ac, bits are extracted beginning with the HI register moving towards the LO register. After entering the LO register, the accumulator must eventually be replenished if more than 64 bits from a bit stream are to be extracted and processed. The CLTHIP instruction moves the contents of the LO register to the HI register so that the next set of 32 bits from the bit stream may be moved into LO. The CLTHIP instruction also increments the pos value in the DSPControl register 203 by the register size (e.g., 32 bits) to shift the current pointer from LO to HI to maintain the relative position of the next bit to be extracted after the CLTHIP instruction. The increment amount 32 is based on the register size and is different for different register sizes.

The "move to HI" or MTHI instruction has the following instruction format:

MTHI rt, ac which moves the contents of the target register rt to the HI register of the selected accumulator ac. A similar MTLO instruction or "move to LO" has the following format:

MTLO rt, ac which moves the contents of the target register rt to the LO register of the selected accumulator ac. Two LW instructions can be used to copy two consecutive words from the bit stream into two different target registers, and then the MTHI and MTLO instructions are used to load the selected accumulator ac with the contents of the respective target registers.

As further described below, the CLTHIP and MTLO instructions may be used together to replenish the accumulator ac after one or more bit extractions from the accumulator. The CLTHIP instruction moves the contents of the LO register to the HI register of the accumulator ac and increments the pos value (by the size of the LO register, or 32), and the MTLO instruction (after being loaded with another word from the bit stream) copies the contents of a GPR into the LO register. Alternatively, a combination "move LO to HI, load LO and increment pos" instruction with the following format:

MTHLIP rt, ac;

performs the combined functions of the CLTHIP and MTLO instruction. In particular, the MTHLIP instruction moves the contents of the LO register for the specified accumulator to the HI register, increments the pos value, and moves the contents of the specified target register rt to the LO register. This instruction may alternatively be considered as a "shift" or "insert" instruction which inserts the contents of the rt register into the lowest position of the accumulator while shifting the contents of the accumulator left by the size of the inserted register (e.g., accumulator left-shifted 32 bits while inserting contents of rt register at the right or least-significant side).

The "write DSP" or WRDSP instruction has the following instruction format:

WRDSP rt, ptn, num;

which causes the microprocessor 101 to write num bits from the right-most location of the rt register into the DSPControl register 203 right justified starting at bit position ptn. As an example, a value for pos of 6 bits (for 32-bit version, 7 bits for 64-bit version) is first written into the least-significant bits of a target register rt, and the WRDSP instruction is then executed with a ptn value of 0 and a num value of 6. The WRDSP instruction causes the pos value in rt to be written into the pos field of the DSPControl register 203 (e.g., DSPControl[5:0]), thereby enabling convenient programming of the pos value. The pos value may be initialized to any convenient value, such as initially 63 for pointing to the most-significant bit in the HI register of the accumulator ac holding the first bit of the bit stream.

The "branch if pos is greater than or equal to 32" or BPOSGE32 instruction has the following instruction format:

BPOSGE32 offset;

which causes the microprocessor 101 to branch to the memory location indicated by the offset value if the pos value from the DSPControl register 203 is greater than or equal to 32. As described further below, a set of instructions including the CLTHIP/MTLO instructions or the MTHLIP instruction are used to replenish the accumulator ac after several bit extraction iterations have almost depleted the bits in the accumulator, or at least when the pos value points to a position in the LO register of the accumulator. The BPOSGE32 instruction enables bypass or branching over the replenishment instructions while pos still indicates a bit position in the HI register of the accumulator. The increment amount 32 is based on the register size and is different for different register sizes.

Figure 6:
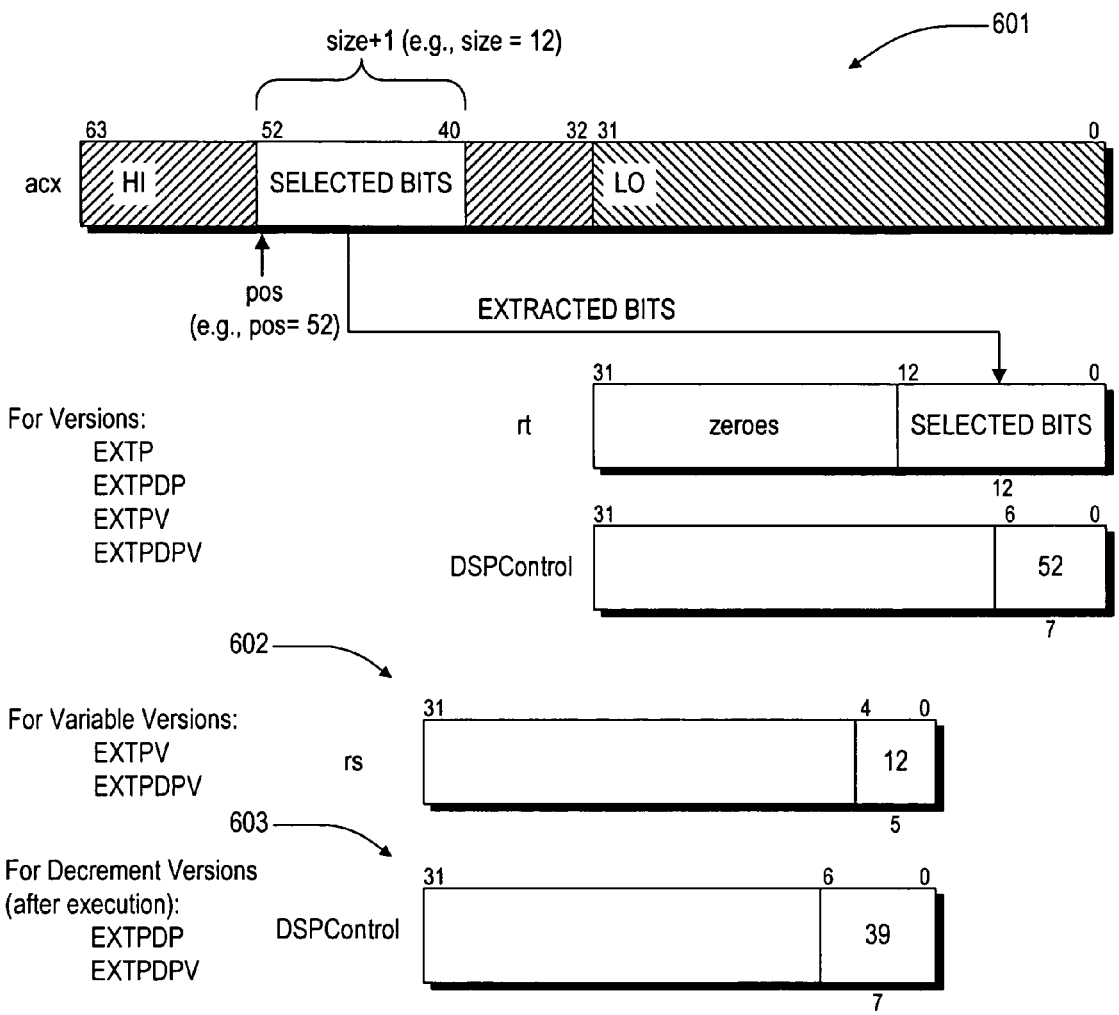
FIG. 6 is a block diagram illustrating operation of each of the extraction instruction variants using a selected accumulator, a target register, the DSPControl register, and an optional GPR source register used by the variable extraction instruction variants.

FIG. 6 is a block diagram illustrating operation of each of the extraction instruction variants using a selected accumulator acx, a GPR target register rt, the DSPControl register 203, and an optional GPR source register rs used by the variable instruction variants. As shown at 601, the HI and LO registers of the accumulator acx are loaded with a portion of a bit stream (indicated by diagonal line shading) and a portion of the bit stream, designated as SELECTED BITS, in the HI register are indicated by the pos and size values. In particular, with a pos value of 52 and a size value of 12, there are 13 SELECTED BITS located at acx[52:40]. As previously described, the size value is an immediate value specified in a size field of the EXTP and EXTPDP instructions or provided in the source register at rs[4:0] for the variable EXTPV or EXTPDPV instruction variants as shown at 602. The SELECTED BITS from the indicated location of the accumulator acx are extracted into the least-significant bits of the rt register, shown as rt[12:0] for the 13 bits indicated. The upper bits of the rt register are zeroed. For the EXTPDP and EXTPDPV decrement instruction variants, the pos value is updated to pos=pos−(size+1) or 52−(12+1)=39 as shown at 603 after the instruction is executed.

Figure 7A:
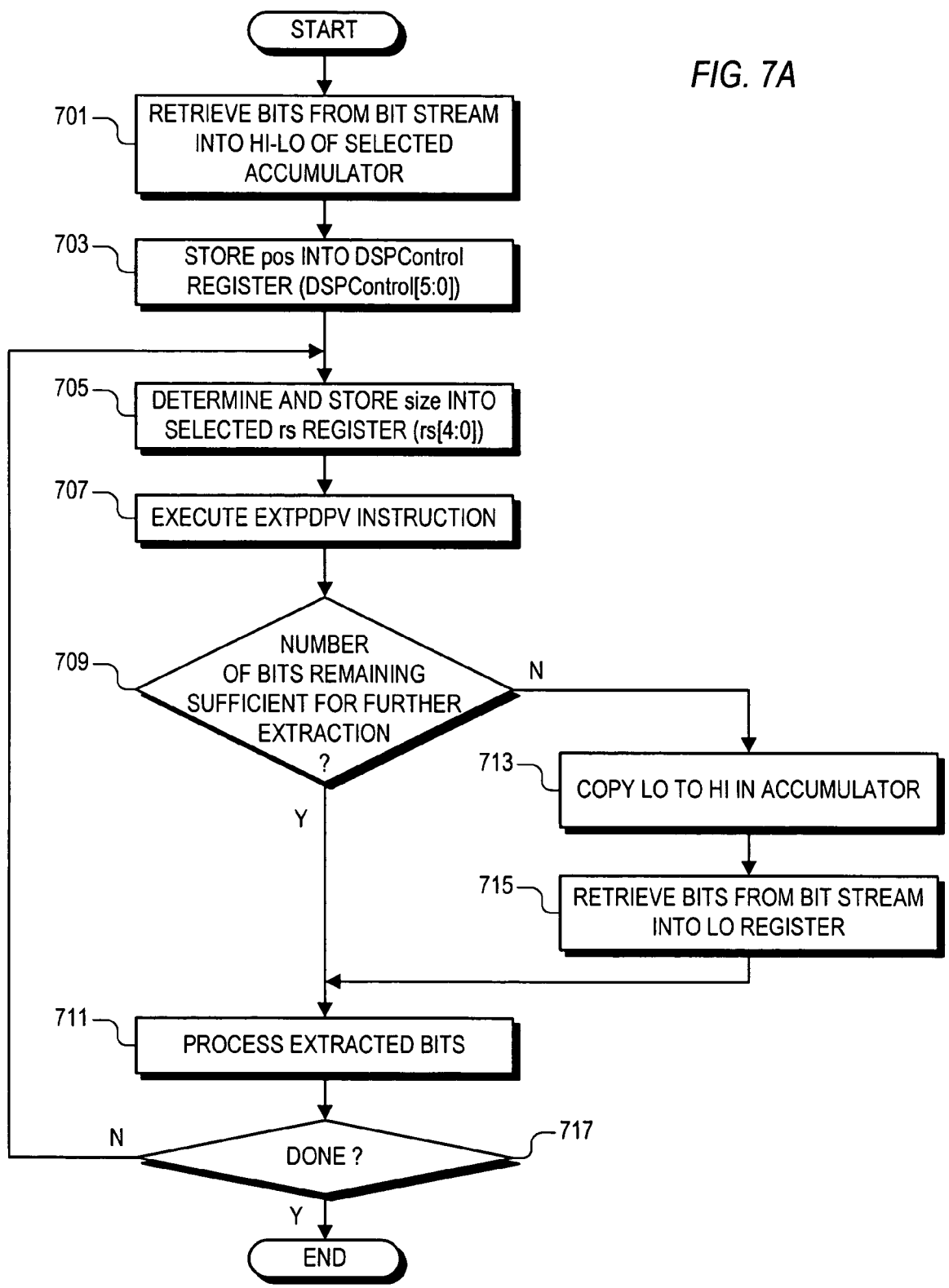
FIG. 7A is a flowchart diagram illustrating an exemplary extraction process using the decrement and variable extraction instruction variant as performed by the microprocessor of FIG. 1.

FIG. 7A is a flowchart diagram illustrating an exemplary extraction process using the decrement and variable extraction instruction variant EXTPDPV as performed by the microprocessor 101 according to an exemplary embodiment of the present invention. The EXTPDPV instruction variant includes both the variable size and automatic decrement functions for purposes of illustration, in which either or both of these functions are excluded for other variants. At first block 701, a portion of the bit stream is retrieved and loaded into the HI-LO registers of a selected accumulator. The load word (LW) (in which a word is 32 bits) or a load doubleword (LD) (or 64 bits) and the MTLO and MTHI instructions are contemplated for loading the accumulator from one or more selected GPRs 201. At next block 703, the pos value is stored into the pos field of the DSPControl register 203. The WRDSP instruction may be used for storing pos from a selected GPR 201 in the illustrated embodiments. The pos value is shown as 6 bits, although any practicable pos size is contemplated for various configurations (e.g., 7 bits for the 64-bit MIPS® microprocessor). The initial pos value may be 63 to point to the most significant bit of a 64-bit accumulator, although the present invention contemplates any practicable initial pos value and accumulator size. At next block 705, a size value is determined and stored into a selected source register rs. The size value is shown as 5 bits, although any practicable number of bits for size is contemplated for various configurations. If the size value is known apriori, then the EXTP and EXTPDP instruction variants may be executed instead and this step is skipped since the size value is provided as an immediate value in the instruction itself.

At next block 707, the EXTPDPV instruction is called for execution to extract the selected number of bits into a selected target register, as further described below. At next block 709, it is queried whether the number of bits remaining in the accumulator is sufficient for further extraction. This query step may be performed by the BPOSGE32 instruction previously described, which branches to a specified offset address if the pos value is greater than or equal to 32, which is the size of the LO register. Variations are contemplated, such as if the size of the LO register is other than 32 bits in which the branch instruction is modified accordingly. If a sufficient number of bits remain in the accumulator (such as if the pos value is greater than or equal to 32), then operation "branches" or proceeds to block 711 in which the extracted bits are processed. Otherwise, if the number of bits remaining after the extraction is not sufficient, then operation proceeds instead to blocks 713 and 715 in which the contents of the LO register are copied to the HI register and additional bits from the bit stream are retrieved into the LO register. In one embodiment, the LW instruction (or the LD instruction) copies bits from the bit stream into a selected GPR 201, the CLTHIP instruction copies the contents of the LO register to the HI register and increments the pos value, and the MTLO instruction moves the contents of the selected register to the LO register. Alternatively, after the load instruction, the MTHLIP instruction replaces the CLTHIP and MTLO instructions to replenish the accumulator. After the functions of blocks 713 and 715 are completed, operation proceeds to block 711 to process the extracted bits. The particulars of bit processing are not further described as not necessary for a full and complete understanding of the present invention.

Operation then proceeds to block 717 to determine whether the extraction process is complete. If not, operation loops back to block 705 in which a new size value may be determined and stored, if desired, where different size values are defined to perform variable bit extraction. After initialization illustrated by blocks 701 and 703, operation loops between blocks 705 and 717 until the bit extraction process is completed. The functions of blocks 713 and 715 are performed to replenish the accumulator with additional bits from the bit stream as necessary until the entire or applicable portion of the bit stream is read and processed. It is appreciated by those skilled in the art that one or more blocks may be reordered and that many variations are possible without departing from the spirit and scope of the present invention. For example, blocks 709, 713 and 715 may be placed before the execution of the EXTPDPV instruction at block 707. In this latter case, the function of block 709 may further be replaced with a function that compares the relative values of size and pos to determine whether there are sufficient bits left for the following execution of the EXTPDPV instruction, and if not to perform the functions of blocks 713 and 715 to replenish the accumulator.

Figure 7B:
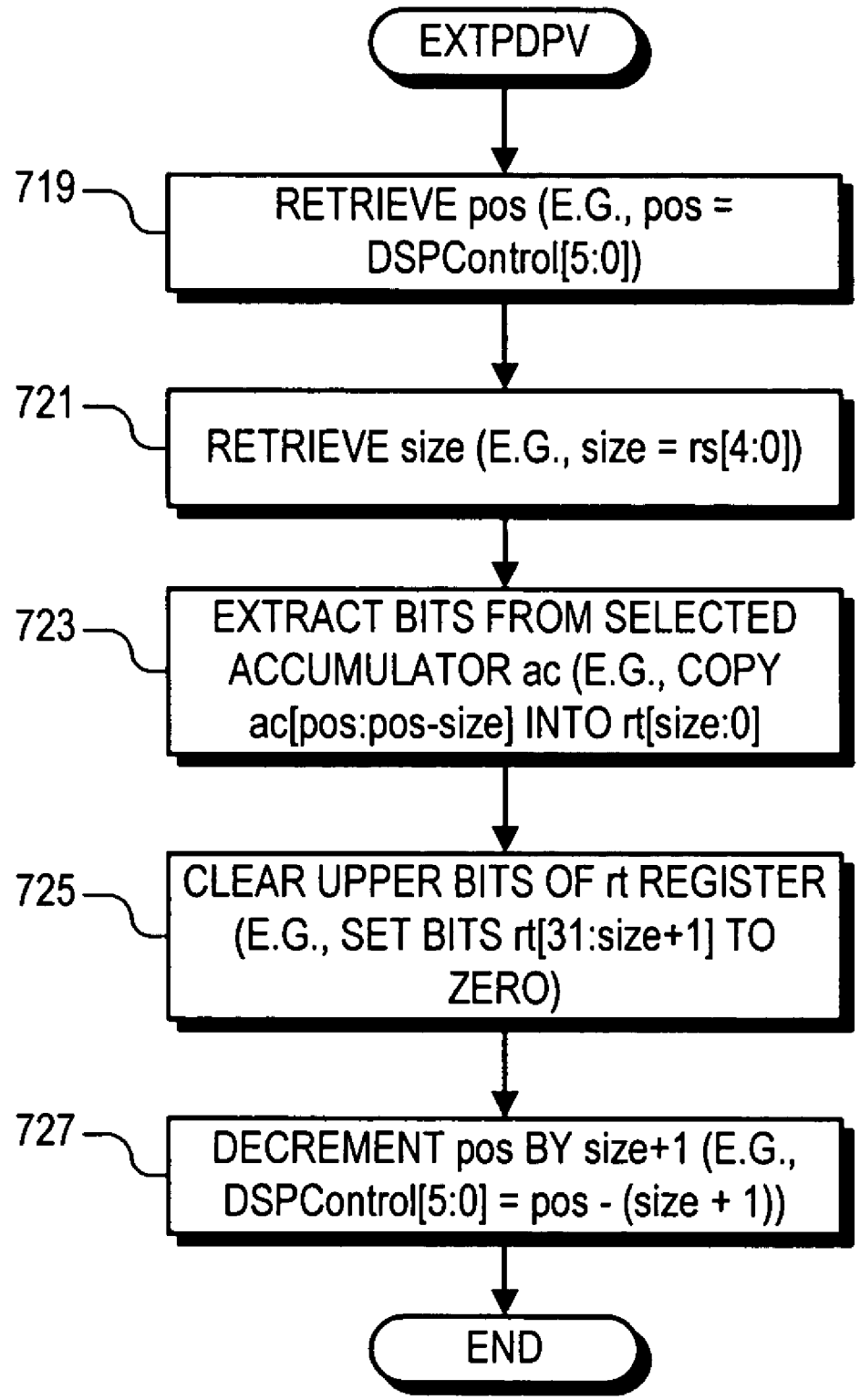
FIG. 7B is a flowchart diagram illustrating internal operation of the microprocessor while executing the decrement and variable extraction instruction variant of FIG. 7A each time it is encountered in the loop.

FIG. 7B is a flowchart diagram illustrating internal operation of the microprocessor 101 while executing the EXTPDPV instruction at block 707 each time it is encountered in the loop. During each execution, the microprocessor 101 retrieves the pos value from the DSPControl register 203 as shown at block 719. Operation then proceeds to block 721 at which the microprocessor 101 retrieves the size value from the specified rs register. Of course, this step is not needed or modified for the non-variable instruction variants (EXTP and EXTPDP) in which the size is specified in the instruction rather than the rs resister. Operation then proceeds to block 723 in which the bits are extracted from the selected accumulator ac into the selected target register rt. As shown, the bits ac[pos:pos-size] are copied into rt[size:0]. Then operation proceeds to block 725 in which the upper bits of the rt register, or rt[31:size+1], are set to all zeroes. At next block 727, the pos value in the DSPControl register 203 is decremented by size+1 and execution of the EXTPDPV instruction is complete so that operation proceeds back to block 709 of FIG. 7A. Of course, the pos value is not decremented for the non-decrement instruction variants (EXTP and EXTPV).

Figure 8A:
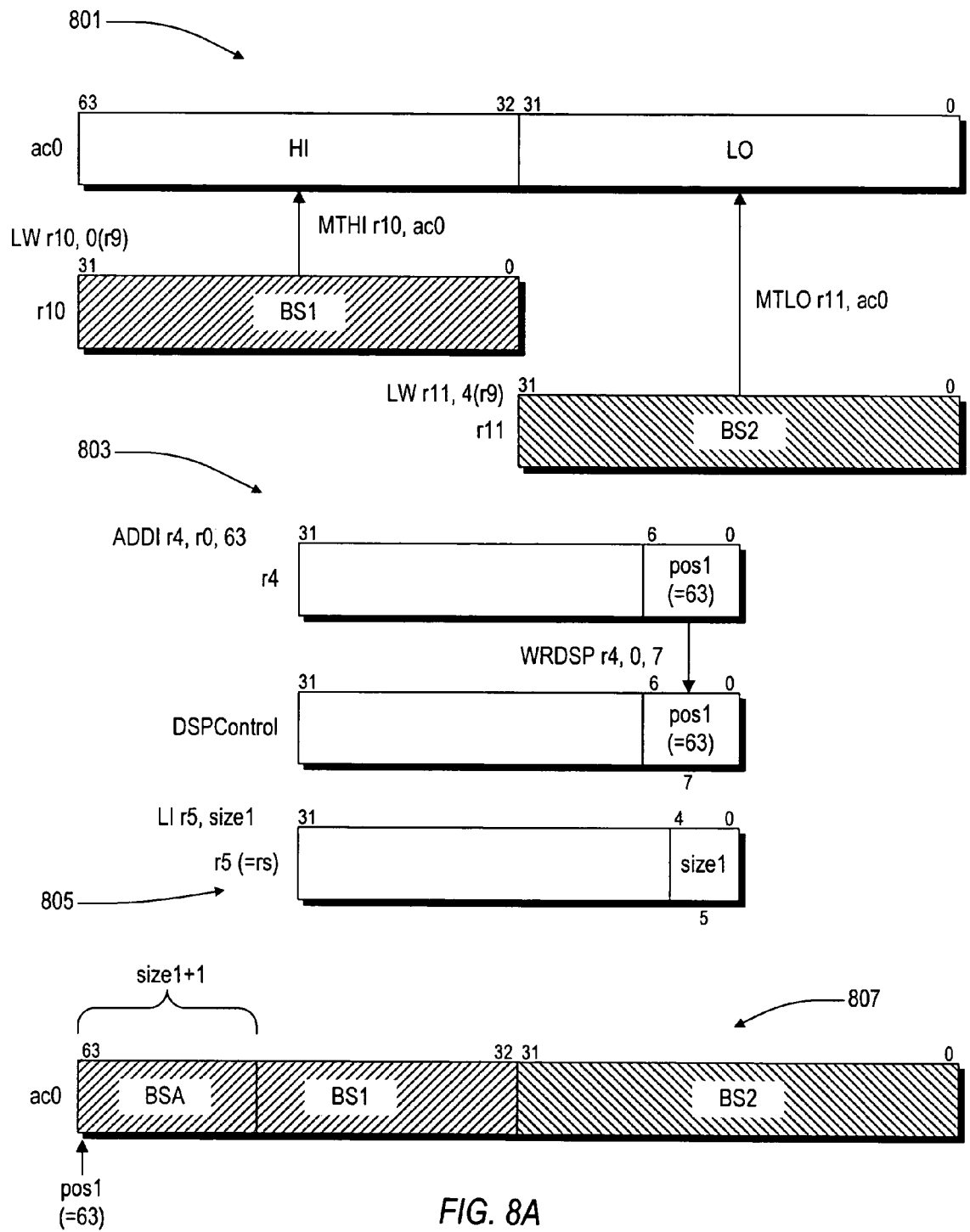
FIGS. 8A-8F collectively show a more detailed example of execution of the variable and decrement extraction instruction variant which employs the variable size value in a source register and which causes the microprocessor to automatically decrement the position value in the DSPControl register during execution.

FIGS. 8A-8F collectively show a more detailed example of execution of the variable and decrement extraction instruction variant EXTPDPV, which employs the variable size value in a source register and which causes the microprocessor 101 to automatically decrement the pos value in the DSPControl register 203 during execution. FIG. 8A illustrates an initialization process to load a portion of the bit stream into a selected accumulator ac0 to enable the bit stream process. As shown at 801, the following pseudo instructions are executed:

LW r10, 0(r9);
LW r11, 4(r9);
MTHI r10, ac0;
MTLO r11, ac0;

in which register r9 stores an initial address of the bit stream file 105 located in the memory 105. The first LW instruction loads the first 32-bit word (4 bytes) from the bit stream file 110, at offset 0, into register r10 and the next LW instruction loads the next 32-bit word (at offset=4 for a 4 byte offset) into register r11. The first word is labeled BS1 and the second word is labeled BS2. The MTHI instruction then loads BS1 from the register r10 into the HI register and the MTLO instruction loads BS2 from the register r11 into the LO register of the accumulator ac0 as illustrated at 801.

As shown at 803, the following pseudo instructions are executed to initialize the pos value:

ADDI r4, r0, 63;
WRDSP r4, 0, 7;

where the ADDI instruction causes the microprocessor 101 to add the immediate value to the contents of the register r0 and store the results into the register r4. Since the register r0 is hardwired to all zeroes, the initial value of 63 is stored into register r4. The WRDSP instruction then loads the value of 63 from register r4 into the pos field of the DSPControl register 203, shown as a pos1 value at 803. As shown at 805, the following instruction is executed to initialize the size value:

LI r5, size1;

where the LI instruction causes the microprocessor 101 to load a particular size value, shown as size1, into the register r5 used as the source register rs in this example.

The final result is illustrated at 807 of FIG. 8A, where BS1 is loaded into the HI register and BS2 is loaded into the LO register of the accumulator ac0. The pos1 value of 63 points to the most-significant bit of the accumulator ac0. The size1 value indicates a portion of the first word BS1 of the bit stream as a bit stream section BSA located at ac0[63:63-size1] having a total of size1+1 bits. The particular value of size1 is not specified in this example other than the fact that it is less than 32.

Figure 8B:
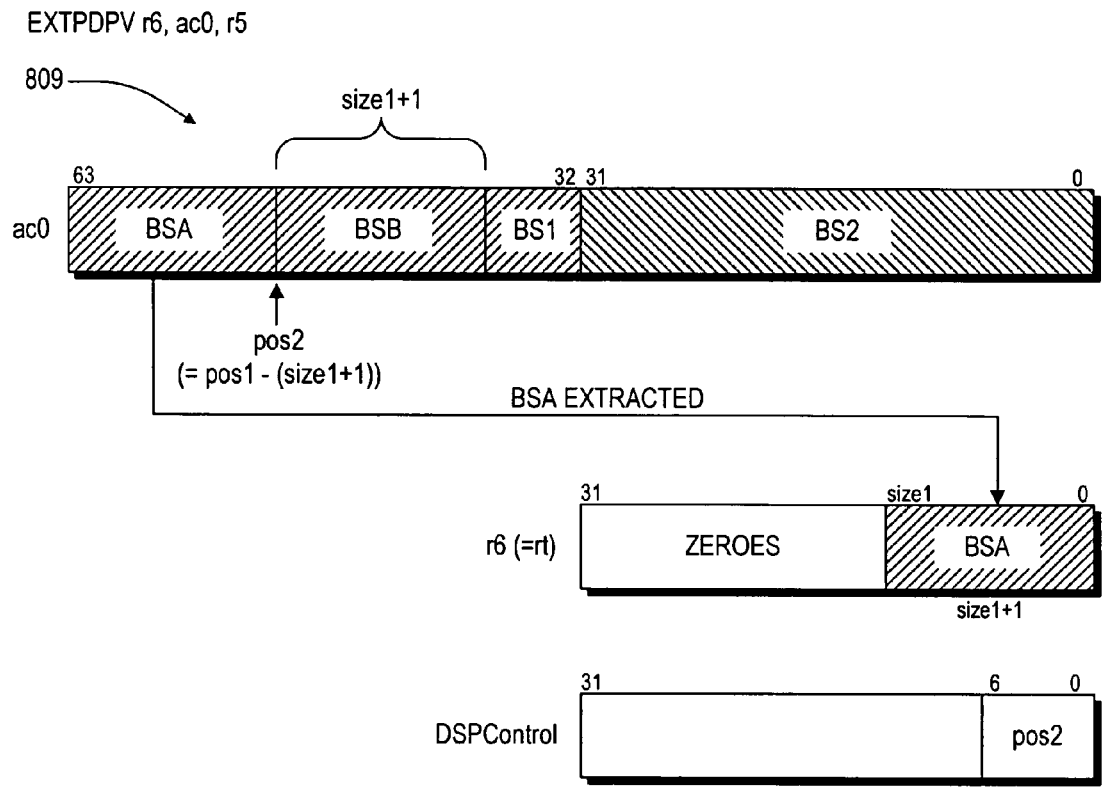

FIG. 8B is a block diagram illustrating at 809 the result of execution of the following instruction:

EXTPDPV r6, ac0, r5;

on the initialized accumulator ac0 shown at 807. The bit section BSA is copied into the corresponding size1+1 least-significant bits of the register r6 selected as the target register, or r6[size1:0]. The remaining bits of rt, or rt[31:size1+1] are zeroed. The pos field of the DSPControl register 203 is decremented by size1+1 to a new value pos2, or pos2=pos1−(size1+1). Since pos is decremented to the new value pos2, a next bit section BSB is indicated beginning at pos2 and including size1+1 bits. The EXTPDPV instruction can be executed several more times in succession to retrieve additional size1+1 bit sections until all or substantially all bits in the accumulator ac0 have been extracted. Alternatively, as soon as the pos value is decremented below 32 (indicating a bit position in the LO register), then BS2 is copied into the HI register and the next bit section is loaded into the LO register.

Figure 8C:
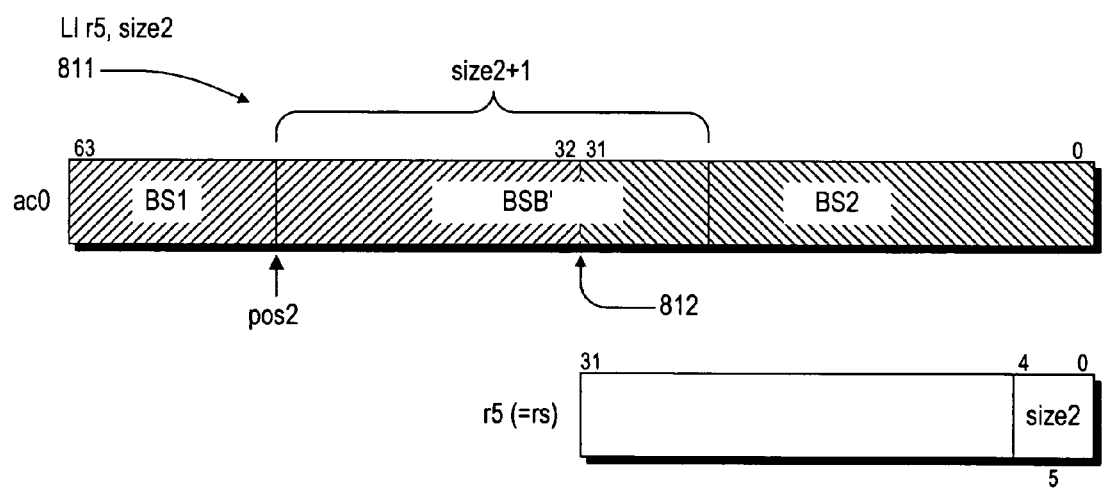

FIG. 8C is a block diagram showing at 811 the result of modifying the size value from size1 to size2 for the next bit extraction operation to illustrate variable bit extraction. In this case, the following instruction is executed:

LI r5, size2;

in which the size1 value in the r5 register is replaced with a new value size2 indicating a bit section BSB' with a different size, or size2+1. The left-most position of BSB' remains unchanged since pos2 remains unmodified. In this case, the new bit section BSB' is larger than BSB since size2 is larger than size1. As illustrated, the BSB' bit section extends past the center position 812 located between bit 31 (the most significant bit of the LO register) and bit 32 (the least significant bit of the HI register) and into the next 32-bit word BS2 of the bit stream.

Figure 8D:
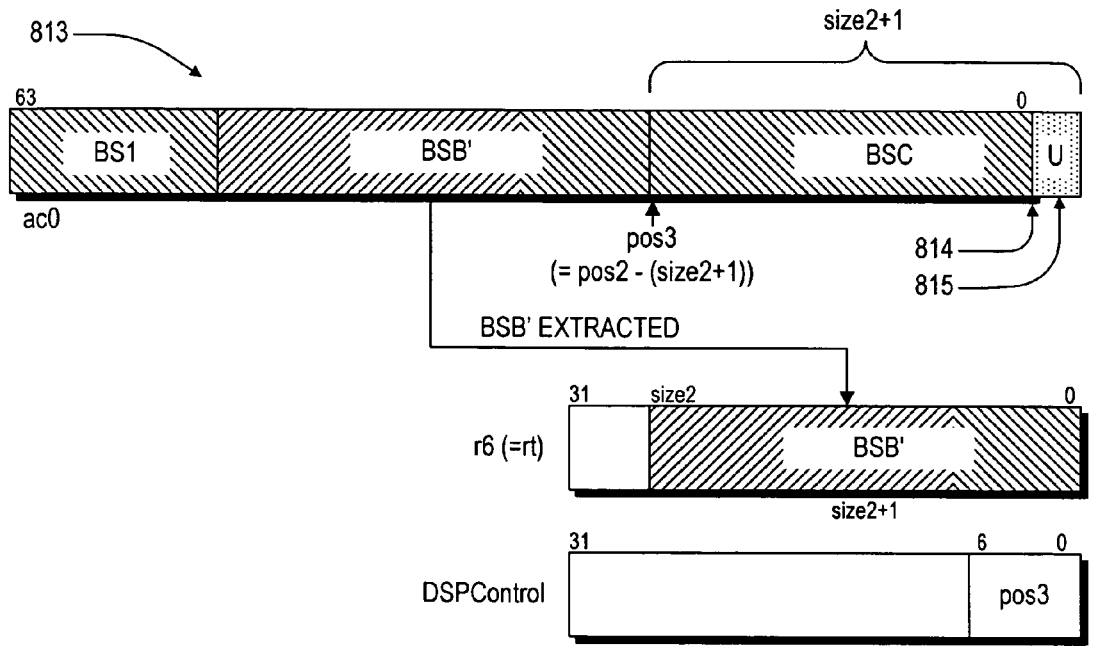

FIG. 8D is a block diagram illustrating at 813 the result of executing the EXTPDPV instruction again as follows using the new size value size2:

EXTPDPV r6, ac0, r5;

The bit section BSB' is copied into the corresponding size2+1 least-significant bits of the register r6 selected as the target register, or r6[size2:0]. The remaining bits of rt, or rt[31:size1+1] are zeroed. The pos field of the DSPControl register 203 is decremented by size2+1 to a new value pos3, or pos3=pos2−(size2+1). Since pos is decremented to the new value pos3, a next bit section BSC is indicated beginning at pos3 and including size2+1 bits. In this case, however, the bit section BSC, being the same size as BSB', is larger than the remaining bits of the accumulator ac0, so that the bit section BSC otherwise extends past the 0 bit position, shown at 814, into an undefined area 815.

Figure 8E:
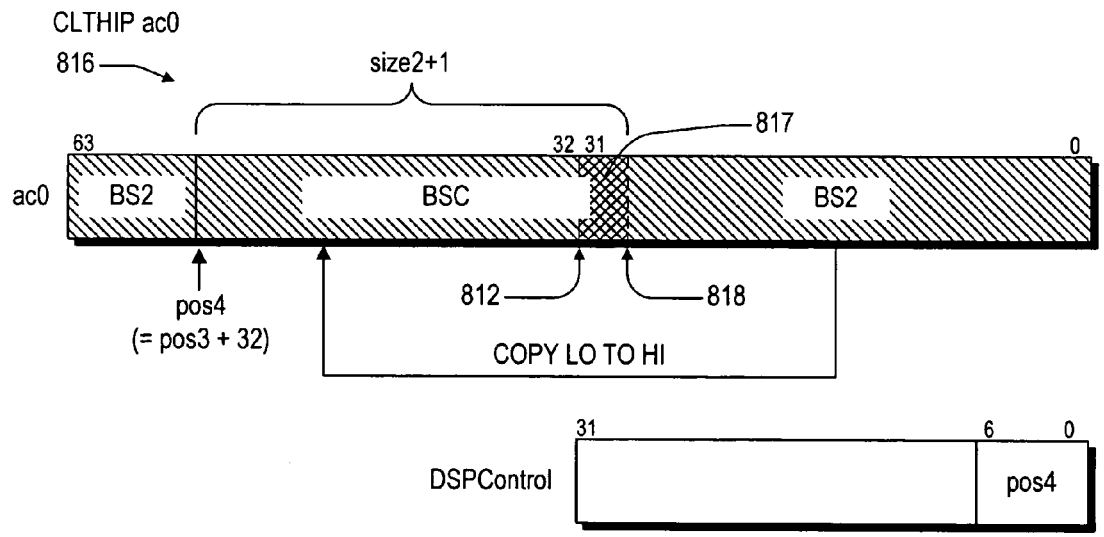

FIG. 8E is a block diagram illustrating at 816 the result of executing the CLTHIP instruction on the accumulator ac0 illustrated at 813 as follows:

CLTHIP ac0;

which copies the contents of the LO register, containing the word BS2, into the HI register of the accumulator ac0 and which also increments the pos value from pos3 to pos4, or pos4=pos3+32. As shown at 813, pos3 is positioned within the LO register prior to execution of the CLTHIP instruction. Recall that the BPOSGE32 can be used to check for the condition that the pos value is less than 32 to determine whether to execute the CLTHIP instruction. For example, in a set of instructions, such as a loop or the like, the BPOSGE32 and CLTHIP instructions follow the EXTPDPV instruction. If pos is greater than or equal to 32, then the BPOSGE32 branches to bypass the CLTHIP instruction, but otherwise the CLTHIP instruction is executed to copy the contents of the LO register to the HI register. After the CLTHIP instruction is executed on the accumulator ac0 as shown at 816, the BSC section is mostly in the HI register but still extends past the centerline 812 into the LO register to a bit location shown at 818. The overlapping section, shown at 817, is the first few bits of the word BS2, which, if read, would lead to an incorrect result. Thus, the LO register of the accumulator ac is updated with the next word from the bit stream.

Figure 8F:
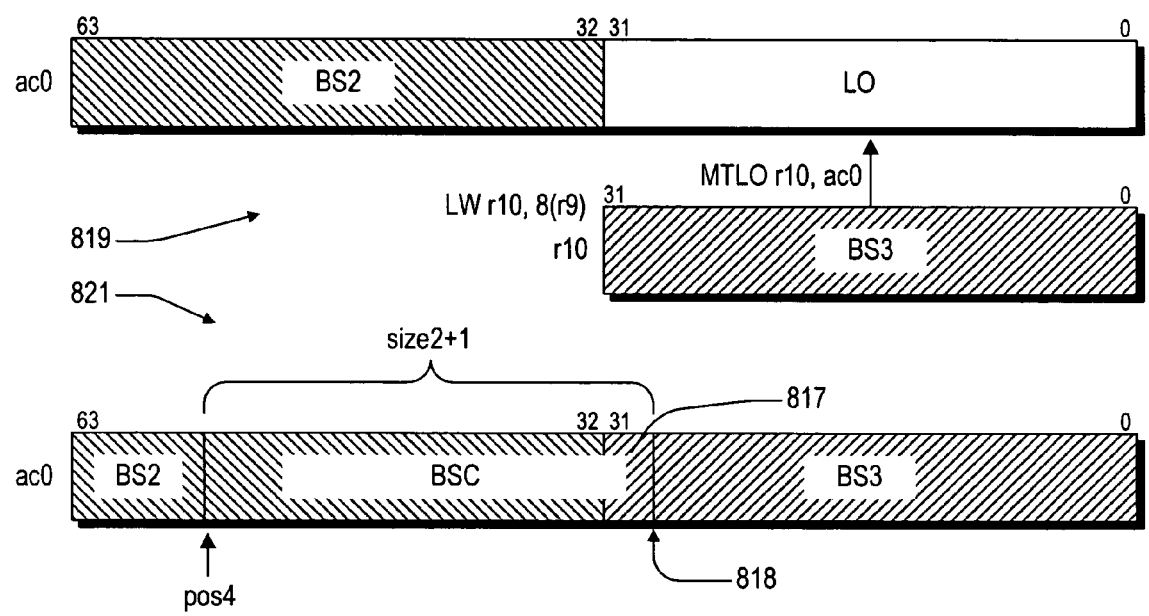

FIG. 8F is a block diagram illustrating at 819 the result of updating the contents of the LO register of the accumulator ac with the next word BS3 from the bit stream from the bit stream file 110 using the following instructions:

LW r10, 8(r9);
MTLO r10, ac0;

where, again, register r9 stores the initial address of a bit stream file 105. The LW instruction loads the next 32-bit word BS3 from the bit stream file 110 at offset 8 into register r10 and the MTLO instruction copies the BS3 word from register r10 into the LO register of the accumulator ac0. The result is shown at 821 in which the overlapping section 817 of the bit section BSC now extends into the next word BS3 from the bit stream, which enables the proper result. Operation can proceed in this manner until the entire bit stream of the bit stream file 110 is retrieved, extracted and processed.

FIGS. 8E and 8F also collectively illustrate the result of the MTHLIP instruction which combines the functions of the CLTHIP and MTLO instructions as previously described. As before, the LW (or LD) instruction first loads the next word (or double-word) BS3 from the bit stream into a selected GPR. The MTHLIP instruction copies the word BS2 in the LO register into the HI register of the accumulator ac0, increments the pos value to pos4, and then copies the BS3 word into the LO register of the accumulator ac0, all in a single instruction. The function of the MTHLIP instruction may alternatively be described as inserting the contents of the loaded GPR into the lowest position of the accumulator ac0 while left-shifting the contents of the accumulator ac0 by the size of the LO register and incrementing the pos value by the appropriate amount to achieve the same result.

In summary, an accumulator is used for the bit extract process in which any one of the four of the MIPS™ DSP ASE can be used for this purpose. The bit extract process operates by loading the HI and LO registers with two initial sections from the bit stream. The size of the sections loaded from the bit stream are determined by the size of the registers. It is noted that all naturally occurring bit streams are big-endian, hence, a LD instruction, which reads two words from the bit stream, works correctly on a big-endian processor, but does not work correctly on a little endian processor. Hence, on a MIPS64™ little-endian processor, a pair of LW instructions are used to ensure that the bit stream is loaded correctly into the selected accumulator. The pos field in the DSPcontrol register 203 is loaded with the appropriate pos value to point to the highest bit position of the active bits in the HI-LO pair. For the MIPS32™ architecture with positions from 0 to 63, an initial value of 63 properly extracts all of the bits. As previously noted, however, the present invention is not limited to any of the MIPS™ architectures and the initial pos value can be any value selected by the user or programmer. The illustrated embodiments employ the MIPS32™ architecture, where it is understood that analogous operations may be performed on the MIPS64™ architecture.

Once the HI-LO registers and the pos value are initialized, the states are ready for beginning the bit extract process. The number of bits to be extracted, based on the size value, is put into a selected source register to use the variable variants of the instruction, or, if the size value is known at compile-time, is provided as an immediate value for the non-variable variants of the instruction. The variable versions (EXTPV and EXTPDPV) enable flexibility for programming the bit extraction process for a bit stream with variable field lengths. The non-variable variants (EXTP and EXTPDP) allow the savings of register usage since a source register is not necessary. The number of bits to be extracted from the HI-LO pair, as specified by the size value, is extracted from the left-most position specified by the pos value and placed into the right-most position of the target GPR, and the upper bits of the target GPR are zero-filled. This readies the extracted bits for immediate use, such as, for example, a comparison with a flag value, etc. The decrement variants (EXTPDP and EXTPDPV) further decrement the pos value in the control register based on the size value once the extraction is done, which readies the pos value for the next extract instruction. The non-decrement variants (EXTP and EXTPV) are useful when the user needs to first verify the contents of the next "size" number of bits without actually removing them from the bit stream. Once all the bits in HI register (and potentially some in the LO register) are extracted, a new word is copied from the bit stream. This is done by copying LO to HI, incrementing the pos value by the size of the LO register, and then moving a new word from the bit stream into the LO register.

FIG. 9 shows pseudo code of an exemplary bit extraction process for a common case employing the variable and decrement extraction instruction variant EXTPDPV. As illustrated by the pseudo code, the bit extraction process is performed in 3 instructions. In most practical applications, there are additional processing instructions between the EXTPDPV instruction and the BPOSGE32 branch instruction to process the extracted bits. Such additional processing is algorithm-specific and is not shown. Without a bit extract instruction implemented according to the present invention, the common bit extraction process would instead require at least 7 instructions. In this manner, there is a reduction of the number of instructions needed for bit extraction for the common case by a factor of 2.33.

When a refill needs to happen, an additional 3 instructions are needed for the bit extraction process employing the bit extraction instructions implemented according to the present invention. Note that the refill process can further be reduced to only 2 instructions by replacing the CLTHIP and MTLO instructions with the MTHLIP instruction. But without the bit extraction instructions, an additional 5 instructions would otherwise be required to perform the refill process. Thus, there is additional savings for the refill process. In this manner, the bit extraction instructions implemented according to the present invention reduce the total number of instructions from 12 to 6 or even 5 representing an overall reduction by at least a factor of 2 or more.

If it is assumed that a refill is invoked after five bit extract operations, on the average, then the instructions needed are reduced from a total of 40 instructions without the present bit extraction instructions (e.g., (7×4)+12 =40) to a total of 19 instructions employing the present bit extraction instructions (e.g., (3×4)+7 =19), which represents an overall reduction by a factor of more than 2. For an algorithm such as Dolby® Digital by Dolby Laboratories, Inc., in which as much as 30% of its execution time is typically spent performing bit-extraction, execution time is reduced corresponding to an overall algorithm speed increase of about 15%. If the total CPU requirement for Dolby® Digital is 50 MHz, then the CPU requirement may be reduced to 42.5 MHz to achieve the same result. This approximation is only made for this particular bit extraction part of the Dolby® Digital algorithm. Together with other features of the DSP ASE, the overall improvement for the Dolby Digital algorithm is even higher.

FIG. 10 shows pseudo code for a Huffman decode compare loop employing the variable extraction instruction variant EXTPV. The register r7 holds a pointer to a Huffman table stored in memory. The number of bits are the first entry in the table, followed by the code word. Huffman decoding involves finding a best match between a possible code in the bit stream and the Huffman Code Book. The EXTPV instruction is used to extract a different number of bits from the bit stream each time to check against the last entry in the Huffman Code table. This version of the instruction does not alter the pos value in the DSPControl register. Once a match has been found, then the EXTPDPV instruction may be used to retrieve the bits and change the pos value. The Huffman decode loop implemented with the DSP ASE instructions as shown takes 5 instructions. Using the instructions of the MIPS32™ architecture without the DSP ASE instructions, the same Huffinan loop takes 15 instructions, providing a savings of 10 instructions.

It is now appreciated by those skilled in the art that the set of extraction instructions implemented according to an embodiment of the present invention simplifies and reduces the source code, and further optimizes performance by significantly reducing the execution time required to perform the same bit extraction process as compared to conventional configurations without the bit extraction instructions. Programming resources are optimized and code performance is maximized.

Although the present invention has been described in considerable detail with reference to certain preferred versions thereof, other versions and variations are possible and contemplated. For example, the particular instruction decodings, mnemonics, formats, etc., may be modified without departing from the spirit and scope of the present invention. The sizes of each of the values may also be increased, such as, for example, doubled in the 64-bit case as compared to the 32-bit case illustrated. The accumulator may comprise a single register rather than a HI-LO pair. The bit extraction set of instructions have been defined as a DSP extension to the basic set of microprocessor instructions, but could be incorporated as part of the basic instruction set if desired.

Incorporation into the primary instruction set architecture (ISA) may be valuable in some configurations since the use of bit extraction functions is not limited to DSP functions. In the embodiment illustrated, the DSP ASE is synthesized into the same core as the primary microprocessor, but could also be synthesized into a coprocessor in a microprocessor system utilizing a coprocessor.

Although the present invention and its benefits, features and advantages have been described in detail, other embodiments are encompassed by the invention. In addition to implementations of the invention using hardware, the invention can be embodied in software (e.g., computer readable code, program code, instructions and/or data) disposed, for example, in a computer usable (e.g., readable) medium. Such software enables the function, fabrication, modeling, simulation, description and/or testing of the apparatus and method described herein. For example, this can be accomplished through the use of general programming languages (e.g., C, C++, JAVA, etc.), GDSII databases, hardware description languages (HDL) including Verilog HDL, VHDL, and so on, or other available programs, databases, and/or circuit (i.e., schematic) capture tools. Such software can be disposed in any known computer usable (e.g., readable) medium including semiconductor memory, magnetic disk, optical disc (e.g., CD-ROM, DVD-ROM, etc.) and as a computer data signal embodied in a computer usable transmission medium (e.g., carrier wave or any other medium including digital, optical, or analog-based medium). As such, the software can be transmitted over communication networks including the Internet and intranets. It is understood that the invention can be embodied in software (e.g., in HDL as part of a semiconductor intellectual property core, such as a microprocessor core, or as a system-level design, such as a System on Chip or SOC) and transformed to hardware as part of the production of integrated circuits. Also, the invention may be embodied as a combination of hardware and software.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A processor configured to perform efficient bit stream extraction, comprising:
   a plurality of registers including a first register that stores bits copied from a bit stream, a second register that stores a position value, and a third register; and
   logic that executes an extraction instruction that causes said logic to extract a specified number of bits beginning at said position value from said first register into said third register and to decrement said position value in said second register by said specified number of bits.

2. The processor of claim 1, wherein said first register comprises an accumulator, said second register comprises a control register, and said third register comprises a general purpose register.

3. The processor of claim 2, wherein said accumulator comprises a HI-LO pair of registers.

4. The processor of claim 3, wherein said logic further executes a copy instruction that causes said logic to copy said LO register to said HI register and to increase said position value by the size of said LO register.

5. The processor of claim 3, wherein said logic further executes a move instruction that causes said logic to copy said LO register to said HI register, to increase said position value by the size of said LO register, and to move contents of a fourth register to said LO register.

6. The processor of claim 3, wherein said logic further executes a branch instruction that causes said logic to branch based on said position value.

7. The processor of claim 6, wherein said branch instruction determines whether said position value indicates a bit of said LO register.

8. The processor of claim 1, wherein said extraction instruction includes a field for storing an immediate size value providing said specified number of bits.

9. The processor of claim 1, further comprising:
said plurality of registers including a fourth register storing a size value providing said specified number of bits;
said extraction instruction including a source field specifying said fourth register; and
said logic further retrieving said size value from said fourth register to determine said specified number of bits.

10. A microprocessor system, comprising:
a microprocessor, comprising:
a plurality of registers including a first register that stores bits copied from a bit stream, a second register that stores a position value, and a third register; and
an execution unit, coupled to said plurality of registers, that executes program instructions; and
a memory, coupled to said microprocessor, that stores said instructions, said instructions including:
a bit extraction instruction that causes said execution unit to extract a specified number of bits beginning at said position value from said first register into said third register and to decrement said position value by said specified number of bits.

11. The microprocessor system of claim 10, wherein said first register comprises an accumulator, wherein said second register comprises a control register, and wherein said third register comprises a general purpose register.

12. The microprocessor system of claim 11, wherein said accumulator comprises a HI-LO pair of registers.

13. The microprocessor system of claim 12, wherein said instructions include a move instruction that further causes said execution unit to move contents of said LO register to said HI register and to increase said position value by the size of said LO register.

14. The microprocessor system of claim 13, wherein said move instruction further causes said execution unit to copy the contents of a fourth register into said LO register.

15. The microprocessor system of claim 13, wherein said instructions include a branch instruction that further causes said execution unit to branch to a specified offset based on said position value.

16. The microprocessor system of claim 15, wherein said branch instruction causes said execution unit to determine whether said position value indicates a bit position of said LO register.

17. The microprocessor system of claim 10, wherein said bit extraction instruction includes a field storing an immediate size value which provides said specified number of bits.

18. The microprocessor system of claim 10, further comprising:
said plurality of registers including a fourth register storing a size value which provides said specified number of bits;
said bit extraction instruction including a field specifying said fourth register as including said size value; and
said bit extraction instruction further causing said execution unit to retrieve said size value from said fourth register to determine said specified number of bits.

19. The microprocessor system of claim 10, wherein:
said memory stores a bit stream file; and
wherein said instructions include a load instruction that further causes said execution unit to load portions of said bit stream file into a fourth register and a move instruction that further causes said execution unit to move the contents of said fourth register into said first register.

20. The microprocessor system of claim 10, further comprising:
at least one input/output device, coupled to said microprocessor, including a buffer that stores data from a bit stream; and
wherein said instructions include a load instruction that further causes said execution unit to load said data from said buffer into a fourth register and a move instruction that further causes said execution unit to move the contents of said fourth register into said first register.

21. A bit extraction instruction for execution on a microprocessor having a plurality of registers including a control register storing a position value, the bit extraction instruction comprising:
a plurality of opcode bits for designating the bit extraction instruction; and
a plurality of operand bits that designate an accumulator storing bits from a bit stream, a target register, and a size parameter that determines a number of bits to extract;
wherein when the bit extraction instruction is executed on the microprocessor, said number of bits from said bit steam beginning at a bit location of said accumulator indicated by the position value are retrieved from said accumulator and copied into said target register, and said position value is decremented by said number of bits.

22. The bit extraction instruction of claim 21, wherein said plurality of opcode bits includes a first opcode field denoting an extended instruction set, a function field specifying a subclass of instructions, and a second opcode field specifying the bit extraction instruction.

23. The bit extraction instruction of claim 21, wherein said size parameter comprises a size field storing an immediate size value which determines said number of bits to extract.

24. The bit extraction instruction of claim 23, wherein when the bit extraction instruction is executed on the microprocessor, the position value stored in the control register is decremented.

25. The bit extraction instruction of claim 21, wherein said size parameter comprising a field designating a source register that stores a size value that determines said number of bits to extract.

26. The bit extraction instruction of claim 25, wherein when the bit extraction instruction is executed on the microprocessor, the position value stored in the control register is decremented by said size value.

27. A method of extracting bits of a bit stream by a processing system, comprising:
retrieving bits from the bit stream into an accumulator;
specifying a size value that determines a number of bits to extract;
storing a position value into a control register; and
executing a bit extraction instruction, comprising;
retrieving the position value from the control register;

copying the size value number of bits from the accumulator into a target register beginning at a bit position of the accumulator determined by the position value;

setting the remaining bits of the target register to zero; and decrementing the position value by the size value.

28. The method of claim 27, wherein said specifying a size value comprises specifying an immediate size value in the bit extraction instruction and wherein said decrementing comprises decrementing the position value after said copying.

29. The method of claim 27, further comprising:
prior to said executing, storing the size value into a source register;
prior to said copying and during said executing, retrieving the size value from the source register; and
after said copying, decrementing the position value by the size value.

30. The method of claim 27, wherein said retrieving bits from the bit stream into an accumulator comprises:
loading bits from a bit stream into a general purpose register; and
moving the contents of the general purpose register into the accumulator.

31. The method of claim 27, after said decrementing the position value, further comprising:
determining whether the position value indicates a sufficient number of bits in the accumulator for another bit extraction; and
if the position value indicates an insufficient number of bits, retrieving additional bits from the bit stream into the accumulator.

32. The method of claim 31, wherein said determining whether the position value indicates a sufficient number of bits comprises comparing the position value with a predetermined register size.

33. The method of claim 31, further comprising branching to a specified offset address if the position value indicates a sufficient number of bits.

34. The method of claim 27, the accumulator comprising a HI-LO pair of registers, further comprising:
determining whether the position value points to a bit location in the LO register; and
if the position value points to a bit location in the LO register, the method further comprising:
copying the contents of the LO register to the HI register; and
incrementing the position value by the size of the LO register.

35. The method of claim 34, further comprising branching to a specified offset address if the position value points to a location in the HI register.

36. The method of claim 34, further comprising:
loading bits from a bit stream into a general purpose register; and
moving the contents of the general purpose register into the LO register.

37. A computer program product for use with a computing device, the computer program product comprising:
a computer usable medium, having computer readable program code embodied in said medium, for causing a processing element configured to execute a bit extract instruction to extract bits from a bit stream, said computer readable program code comprising:
first program code for providing a plurality of registers including a control register for storing a position value, an accumulator for storing bits from a bit stream, and a target register for storing bits extracted from said accumulator; and
second program code for providing logic for executing said bit extract instruction in which said logic retrieves said position value, extracts a specified number of bits from said accumulator beginning at said position value into said target register, and decrements said position value by said specified number of bits.

38. The computer program product of claim 37, wherein said specified number of bits is provided as an immediate size operand in said bit extract instruction, and wherein said second program code further provides said logic to decrement said position value after extracting said bits.

39. The computer program product of claim 37, wherein said plurality of registers includes a source register for storing a size value, wherein said second program code further provides said logic to retrieve said size value from said source register to determine said specified number of bits to extract, and wherein said second program code further provides said logic to decrement said position value after extracting said bits.

* * * * *